United States Patent [19]
Tamura et al.

[11] Patent Number: 5,430,557
[45] Date of Patent: Jul. 4, 1995

[54] IMAGE PROCESSING UNIT

[75] Inventors: Yutaka Tamura; Shinji Shiraishi, both of Kyoto, Japan

[73] Assignee: Dainippon Screen Mfg. Co., Ltd., Kyoto, Japan

[21] Appl. No.: 993,989

[22] Filed: Dec. 21, 1992

[30] Foreign Application Priority Data

Dec. 27, 1991 [JP] Japan .................. 3-359107

[51] Int. Cl.⁶ .............................................. H04N 1/40
[52] U.S. Cl. .................................. 358/458; 358/534; 358/530; 358/447
[58] Field of Search ............... 358/458, 456, 448, 452, 358/445, 298, 454, 530, 532, 533, 534, 462, 464, 447, 448, 453; 355/268

[56] References Cited

U.S. PATENT DOCUMENTS

| | | | |
|---|---|---|---|
| 4,547,814 | 10/1985 | Hirosawa | 358/534 |
| 4,782,398 | 11/1988 | Mita | 358/456 |
| 4,860,118 | 8/1989 | Arimoto | 358/451 |
| 4,905,023 | 2/1990 | Suzuki | 346/108 |
| 4,958,218 | 9/1990 | Katayama et al. | 358/456 |

FOREIGN PATENT DOCUMENTS

0411911A2 2/1991 European Pat. Off. .

*Primary Examiner*—Edward L. Coles, Sr.
*Assistant Examiner*—Madeleine Nguyen
*Attorney, Agent, or Firm*—Lowe, Price, LeBlanc & Becker

[57] ABSTRACT

In order to prevent a line break phenomenon in reproduction of an image of an original in halftone dots, RGB signals of an original (2) are contour-enhanced by a USM circuit (10), and inputted in a halftone dot signal producing circuit (30) and an edge signal producing circuit (40). The halftone dot signal producing circuit (30) converts image signals (Y-IMA to Bk-IMA) to halftone dot signals (DOT1 to DOT10) at the timing of a clock signal (CL1), to output the halftone dot signals (DOT1 to DOT10) to a synthesizing circuit (11) in response to a first output start signal (ENST). However, an output start time is delayed from the time of receiving the signal (ENST) by a time required for the halftone dot processing. On the other hand, an edge signal producing circuit (40) produces a contour signal (BE, WE) from the image signals at the timing of a clock signal (CL2) having a higher frequency than the clock signal (CL1), and outputs the same in response to a second output start signal (ENSTD) which is delayed by the aforementioned time from the signal (ENST). The synthesizing circuit (11) synthesizes the halftone dot signals (DOT1 to DOT10) with the contour signal (BE, WE), thereby producing exposure signals (EX1 to EX10).

35 Claims, 23 Drawing Sheets

FIG.8

| 1 | 1 | 1 | 1 | 2 | 2 | 2 | 2 |
|---|---|---|---|---|---|---|---|
| 1 | 0 | 0 | 1 | 2 | 3 | 3 | 2 |
| 1 | 0 | 0 | 1 | 2 | 3 | 3 | 2 |
| 1 | 1 | 1 | 1 | 2 | 2 | 2 | 2 |
| 2 | 2 | 2 | 2 | 1 | 1 | 1 | 1 |
| 2 | 3 | 3 | 2 | 1 | 0 | 0 | 1 |
| 2 | 3 | 3 | 2 | 1 | 0 | 0 | 1 |
| 2 | 2 | 2 | 2 | 1 | 1 | 1 | 1 |

FIG.9

IMAGE PROCESSING UNIT

BACKGROUND OF THE INVENTION

1. Field of the Invention

The present invention relates to an image processing unit for converting image signals to recording signals. More specifically, the present invention is applicable to an apparatus for preventing a line break which is caused when an image is reproduced by halftone dot signals.

2. Description of the Background Art

In order to reproduce an image of a read original, variable densities of the image are generally expressed in sizes of halftone dots, i.e., area rates. In this case, the read image is compared with a screen pattern having a prescribed angle which is repeated in a prescribed cycle, to determine the area rates of the respective halftone dots. Thus, the halftone dots themselves have the said prescribed angle as the angle of arrangement.

However, the image may not be continuously reproduced due to relation between the positions of pixels forming the read original and the halftone dot area rates, since the halftone dots themselves have the aforementioned angle of arrangement. Namely, this leads to the so-called line break phenomenon. Particularly when the image contains thin lines having narrow widths, a remarkable line break phenomenon is caused in relation to such thin lines.

Such a line break phenomenon, which is caused not only by the positions of pixels forming the read original and the halftone dots but by the halftone area rates and sampling rates of image signals, has been generally regarded as an unavoidable phenomenon in principle for the method of expressing the variable densities through the sizes of the halftone dots for reproducing the image. If such a line break phenomenon takes place, therefore, a skilled operator draws an appropriate line on a film, to correct the portion causing the line break.

SUMMARY OF THE INVENTION

According to the present invention, an image processing unit comprises: (a) means for reading the image signal of an original; (b) means for producing a first clock signal having a relatively low frequency and a second clock signal having a relatively high frequency, the first and second clock signals being synchronized with each other; (c) means for producing an output start signal; (d) means for producing a halftone dot signal from the image signal in response to the first clock signal to output the halftone dot signal in response to the output start signal; (e) means for producing a contour signal indicative of an edge of the image signal from the image signal in response to the second clock signal to output the contour signal in response to the output start signal; and (f) means for synthesizing the halftone dot signal and the contour signal to produce the exposure signal.

According to the present invention, the halftone dot signal producing means first produces the halftone dot signal from the image signal in response to the first clock signal, and outputs the as-produced halftone dot signal to the synthesizing means when the same receives the output start signal.

On the other hand, the contour signal producing means produces the contour signal from the image signal in response to the second clock signal having a higher frequency than the first clock signal. Thus, the as-obtained contour signal has higher resolution than the halftone dot signal. Then the contour signal producing means outputs the contour signal to the synthesizing means similarly in response to the output start signal.

Thus, the halftone dot signal and the contour signal are synchronously inputted in the synthesizing means, which in turn synthesizes these signals to produce a recording signal.

According to the present invention, as hereinabove described, it is possible to regularly prevent the line break phenomenon, which has generally been unavoidable in the prior art in reproduction of a halftone image of an original, with no regard to the image of the original, whereby the image can be reproduced with continuously connected thin lines and the like.

Accordingly, an object of the present invention is to provide an image processing unit which has a function of regularly preventing a line break phenomenon with no influence by widths of thin lines contained in a read original.

Another object of the invention is to provide an image processing method which achieves such function.

Still another object of the invention is to provide an image processing unit which accomplishes such function by program manipulation by means of a computer.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram showing exemplary signals stored in a screen pattern memory;

FIG. 9 is a diagram illustrating an output of a dot generator;

DESCRIPTION OF THE PREFERRED EMBODIMENTS

Figure 1:
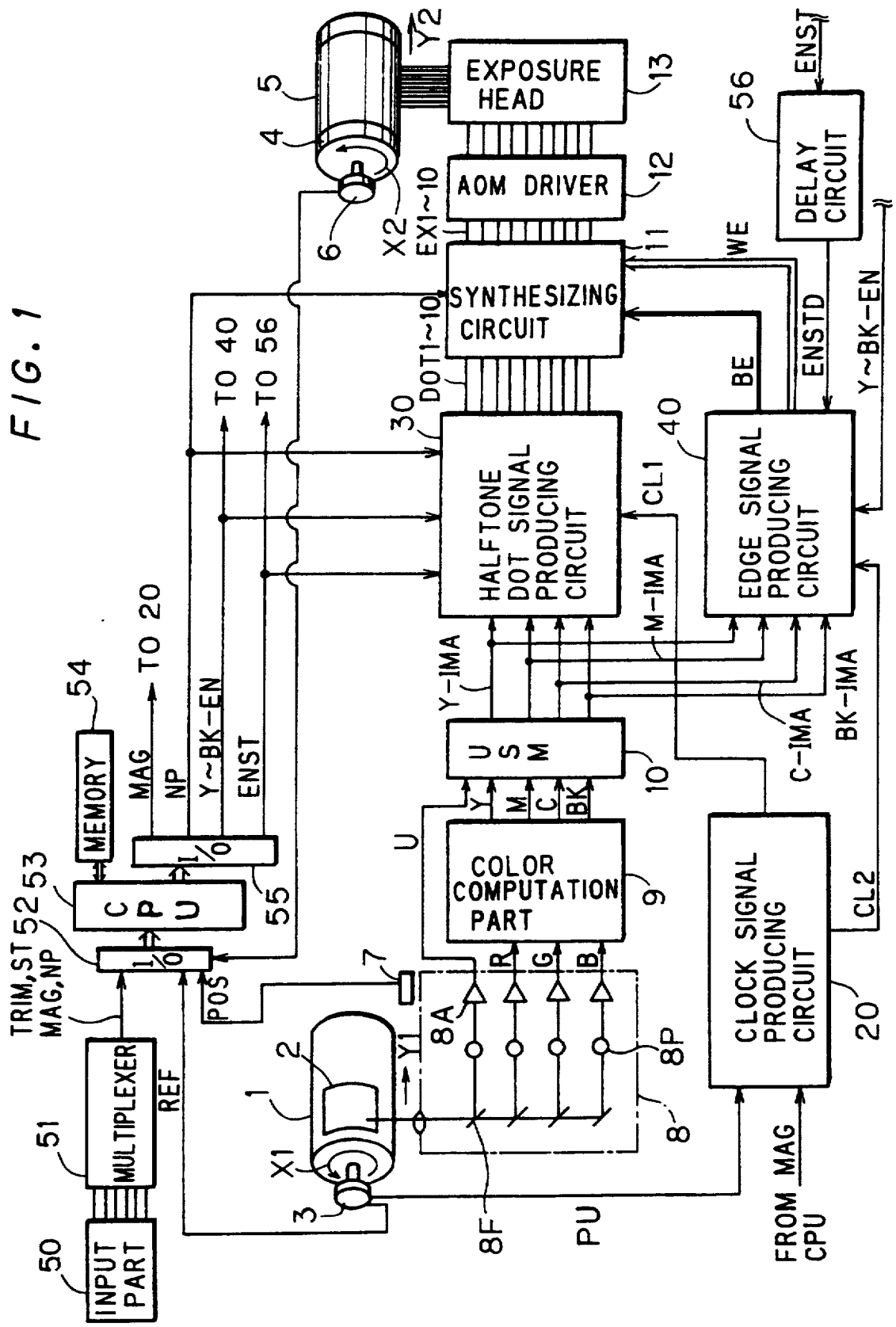
FIG. 1 is a block diagram typically showing the electrical structure of a color scanner according to a preferred embodiment of the present invention.

FIG. 1 is a block diagram typically showing the electrical structure of a color scanner according to a preferred embodiment of the present invention. Referring to FIG. 1, the color scanner is roughly divided into an image input part, a control part, an image processing part and an image output part. The structures and operations of the respective parts are now described successively from the image input part.

(1) Image Input Part

The image input part is formed by an input drum 1, a rotary encoder 3, a linear encoder 7 and a read head 8. The read head 8, which is a detector for optically reading an image of an original 2 being stuck on the input drum 1, comprises three types of filters and mirror 8F for separating incident light into a red (R) light component, a green (G) light component, a blue (B) light component, and an unsharp (U) light component for contour enhancement of the image and converting the same to R, G, B and U signals respectively, four photomultipliers 8P and four amplifiers 8A, as shown in FIG. 1.

On the other hand, the input drum 1 is rotated by a moving mechanism (not shown) in a main scanning direction X1. The rotary encoder 3 which is provided on an end of the rotation axis of the input drum 1 outputs a pulse signal PU of 1000 pulses every rotation of the input drum 1 toward a clock signal producing circuit 20 as described later. The rotary encoder 3 also outputs a reference signal REF of one pulse every rotation of the input drum 1 toward a CPU 53 which is provided in the control part as described later. Consequently, the CPU 53 regularly recognizes the timing of every rotation of the input drum 1.

Further, the read head 8 itself is scanned by a moving mechanism (not shown) in a subscanning direction Y1. The scanning timing thereof is also controlled by the aforementioned CPU 53. Thus, the read head 8 repeats an operation of moving in the subscanning direction Y1 by a prescribed distance which corresponds to the main scanning line width every reading of an image on a single line provided in the main scanning direction X1, to read an image on a new line provided on the main scanning direction X1. The current position of the read head 8 in the subscanning direction Y1 is also managed by the CPU 53, on the basis of a position signal POS generated from the linear encoder 7 which is provided along the subscanning direction Y1.

(2) Control Part

The control part, which is a system formed by an input part 50, a memory 54, a delay circuit 56 and the like around the CPU 53, controls not only the rotation of the input drum 1 and the scanning of the read head 8, but operations of the image processing part and the image output part. Particularly with respect to the image processing part, this control part generates various signals.

First, an operator sticks the original 2 onto the input drum 1, so that the input part 50 (keyboard etc.) inputs trimming signals TRM showing the scanning region through a multiplexer channel 51. The input part 50 also inputs a start signal ST for starting read scanning of the original 2, magnification signals MAG (hereinafter referred to as "magnification signal") indicating recording magnification to the film 5, and signals NP (hereinafter referred to as "negative/positive signal") indicating whether a halftone positive image or a halftone negative image is recorded on the film 5. These signals are inputted in the CPU 53 through an input interface 52 with the reference signal REF and the position signal POS.

On the other hand, the CPU 53 outputs the magnification signal MAC, the negative/positive signal NP, selection signals Y-EN, M-EN, C-EN and K-EN (hereinafter referred to Y-EN to Bk-EN) for respective color separations and a first output start signal ENST to respective elements of the image processing part through an output interface 55. The selection signals Y-EN to Bk-EN for the respective color separations are clock signals which are outputted in accordance with previously set order. For example, it is assumed that a yellow (Y) separation is prepared in the first quarter, and a magenta (M) separation, a cyan (C) separation and a black (Bk) separation are formed in the second to fourth quarters every rotation of the output drum 4. In this case, the selection signal Y-EN is first outputted to perform scanning for the first quarter rotation, and then the selection signal M-EN is outputted to perform scanning for the second quarter rotation. Thereafter the selection signals C-EN and Bk-EN are successively outputted in a similar manner. Throughout the specification, it is assumed that respective color separations are prepared in this order.

While the above description is made with reference to four separations which are arranged in the direction of rotation of the output drum 4, i.e., the main scanning direction X2, such four separations are arranged along the rotation axis of the output drum 4, i.e., the subscanning direction Y2 in the case of a large output size.

A part of the first output start signal ENST is inputted in the delay circuit 56, to be inputted in an edge signal producing circuit 40, as described later, as a second output start signal ENSTD which is delayed by a delay time τ. This delay circuit 56 itself is a simple logic circuit which is formed by a NAND circuit etc. The meaning of the delay time τ is clarified in the following description.

(3) Image Processing Part

The image processing part is formed by a color computation part 9, a USM circuit 10, a clock signal producing circuit 20, a halftone dot signal producing circuit 30, an edge signal producing circuit 40 and a synthesizing circuit 11. In particular, the clock signal producing circuit 20, the halftone dot signal producing circuit 30, the edge signal producing circuit 40 and the synthesizing circuit 11 are elements characterizing the present invention. The outline of the operation in the overall image processing part is now described.

As described above, the read head 8 reads the image of the original 2 every pixel, to separate the same into an R signal, a G signal and a B signal (hereinafter these signals are generically referred to as "RGB signals") and a U signal. Thereafter the color computation part 9 converts the RGB signals to respective signals Y, M, C and Bk (masking). Then, the USM circuit 10 synthesizes the respective signals Y, M, C and Bk with the U signal, to obtain image signals Y-IMA, M-IMA, C-IMA and Bk-IMA (hereinafter referred to as Y-IMA to Bk-IMA) enhancing image signals in an image region corresponding to the contour of the image. Such image processing steps in the color computation part 9 and the USM circuit 10 are well known in the art, and hence redundant description is omitted.

Then, the respective image signals Y-IMA to Bk-IMA contour-enhanced in the USM circuit 10 are inputted in both of the halftone dot signal producing circuit 30 and the edge signal producing circuit 40. The halftone dot signal producing circuit 30 successively produces halftone dot signals for the respective image signals Y-IMA to Bk-IMA in synchronization with a clock signal CL1 produced by the clock signal producing circuit 20 and in response to the received selection signals Y-EN to Bk-EN. The halftone dot signal producing circuit 30 outputs every 10 of the as-produced halftone dot signals to the synthesizing circuit 11 as halftone dot signals DOT1 to DOT10 on the basis of the first output start signal ENST at a time delayed by the delay time $\tau$ from rise of the first output start signal ENST.

On the other hand, the edge signal producing circuit 40 produces a contour signal expressing an edge of the image for every one of the image signals Y-IMA to Bk-IMA similarly in synchronization with a clock signal CL2 generated from the clock signal producing circuit 20 and in response to each one of the received selection signals Y-EN to Bk-EN. This contour signal is separated into a white edge signal WE and a black edge signal BE, to be outputted to the synthesizing circuit 11 in synchronization with the second output start signal ENSTD.

The clock signals CL1 and CL2 are formed by clocks which are produced on the basis of the pulse signal PU. Since the clock signal CL2 is set at a higher frequency than the clock signal CL1, the image signals Y-IMA to Bk-IMA as to the main scanning direction X1 in the edge signal producing circuit 40 are higher in resolution than those in the halftone dot signal producing circuit 30.

The halftone dot signals DOT1 to DOT10 are logically synthesized with the white and black edge signals WE and BE in the synthesizing circuit 11, to be outputted as exposure signals EX1 to EX10. The signals are synchronously synthesized with each other in the synthesizing circuit 11, as clearly understood from the following description.

The outline of the operations in the image processing circuit is as described above. The structures and operations of the clock signal producing circuit 20, the halftone signal producing circuit 30 and the edge signal producing circuit 40 are now described on the basis of a timing chart shown in FIG. 7.

(3-1) Clock Signal Producing Circuit

Figure 2:
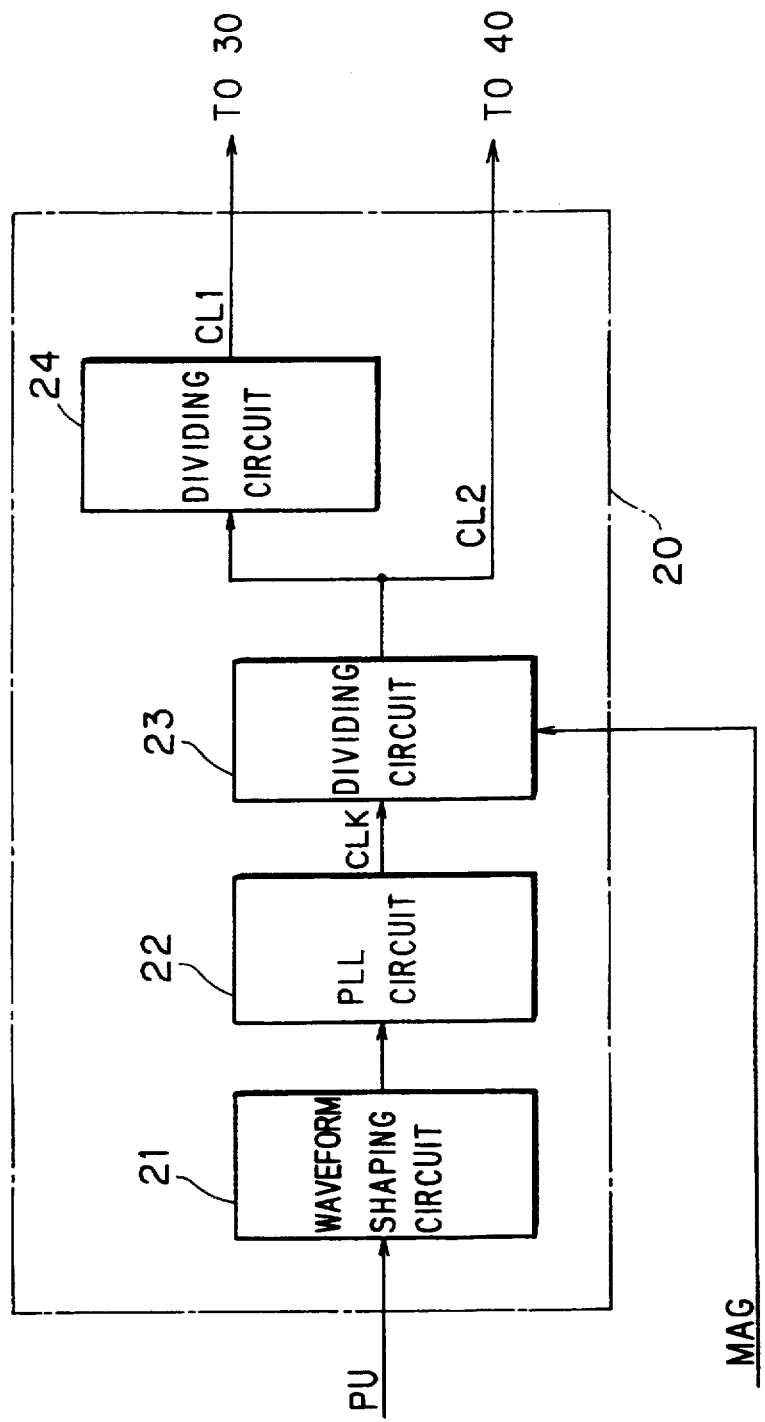
FIG. 2 is a block diagram showing the structure of a clock signal producing circuit.

FIG. 2 is a block diagram showing the structure of the clock signal producing circuit 20. Referring to FIG. 2, the pulse signal PU outputted from the rotary encoder 3 is waveform-shaped in a waveform shaping circuit 21 and inputted in a PLL circuit 22, so that its frequency is multiplied to a prescribed value. The as-multiplied clock signal CLK is thereafter inputted in a dividing circuit 23. The dividing ratio of this dividing circuit 23 is set in response to the magnification signal MAG which is outputted from the CPU 53. The magnification value itself is previously stored in the memory 54. Therefore, the frequency of the clock signal CL2 which is outputted from the dividing circuit 23 is raised up as the magnification signal MAG is increased.

Figure 7:
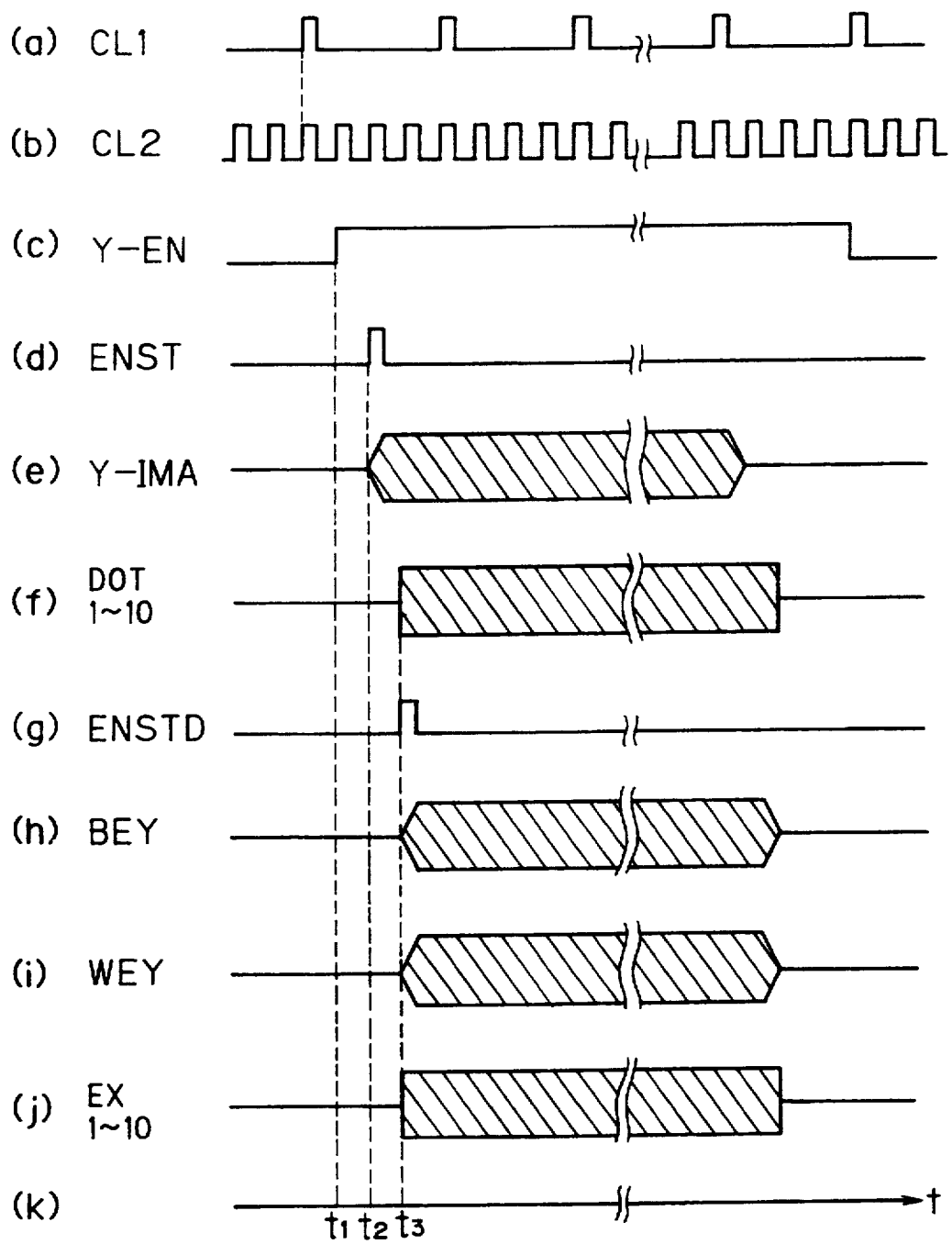
FIG. 7 is a timing chart for illustrating the operation of an image processing part.

The clock signal CL2 is further divided by a dividing circuit 24 of the next stage having a constant dividing ratio, to be outputted as the clock signal CL1. Consequently, the clock signal producing circuit 20 generates the dock signal CL1 and the clock signal CL2 which is higher in frequency than the clock signal CL1. FIG. 7 shows waveforms of the clock signals CL1 and CL2 at (a) and (b) respectively.

(3-2) Halftone Dot Signal Producing Circuit

Figure 3:
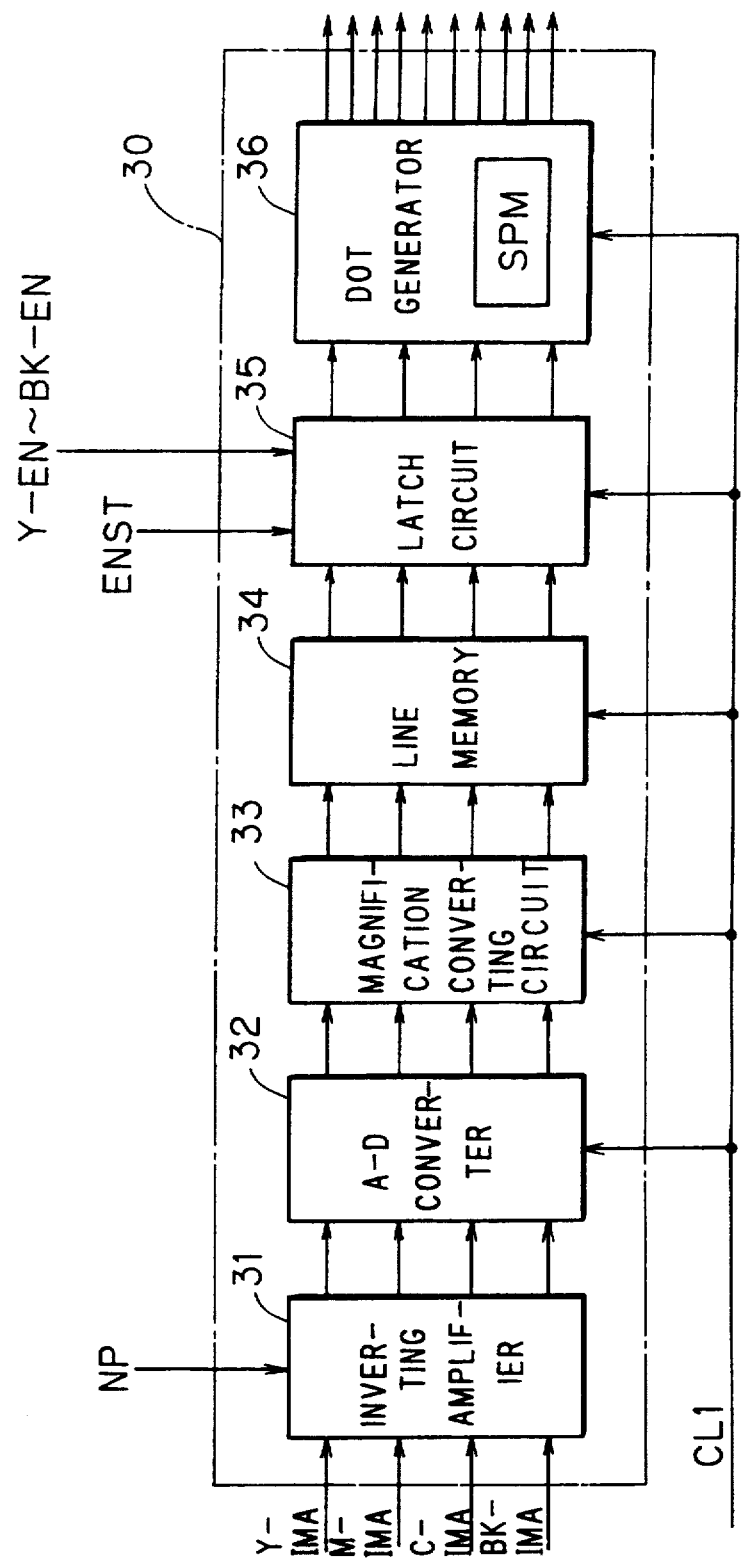
FIG. 3 is a block diagram showing the structure of a halftone dot signal producing circuit.

FIG. 3 is a block diagram showing the structure of the halftone dot signal producing circuit 30. First, the respective image signals Y-IMA to Bk-IMA are inputted in an inverting amplifier 31. This inverting amplifier 31 inverts or does not invert the image signals Y-IMA to Bk-IMA in response to the negative/positive signal NP which is outputted from the CPU 53. In other words, the inverting amplifier 31 inverts the respective image signals Y-IMA to Bk-IMA in order to output a halftone negative film. In order to output a halftone positive film, on the other hand, the inverting amplifier 31 directly outputs the image signals Y-IMA to Bk-IMA to an A-D converter 32 of a next stage without inverting the same.

The A-D converter 32 samples the respective image signals Y-IMA to Bk-IMA (analog signals) received from the inverting amplifier 31 in the cycle of the clock signal CL1, to convert the same to digital signals. The digitalized image signals Y-IMA to Bk-IMA are further converted in a magnification converting circuit 33 to the signal level which is responsive to the magnification (MAG) thereof at the timing of the clock signal CL1, to be stored in a line memory 34 also at the timing of the clock signal CL1. The line memory 34 has memory capacity capable of storing image signals for several lines.

The image signals Y-IMA to Bk-IMA thus stored in the line memory 34 are further latched in a latch circuit 35 at the timing of the clock signal CL1. Then, the image signals Y-IMA to Bk-IMA are transmitted from the latch circuit 35 to a dot generator 36 of the next stage in the following system:

First, the CPU 53 generates the selection signal Y-EN for the Y separation. Assuming that t1 defines a time when the selection signal Y-EN rises from a low level to a high level (see FIG. 7(c)), the latch circuit 35 enters a standby state capable of outputting the image signal Y-IMA for the Y separation among the latched image signals at the time t1.

Then, the CPU 53 generates the first output start signal ENST at a time t2 (see FIG. 7(d)). Consequently, the latch circuit 35 being in the standby state outputs the image signal Y-IMA to the dot generator 36 in response to the signal ENST (see FIG. 7(e)).

The dot generator 36 produces halftone dot signals from the image signal Y-IMA at the timing of the clock signal CL1, to output every 10 signals to the synthesizing circuit 11 as the halftone dot signals DOT1 to DOT10 (10 bits).

Since each of the halftone dot signals DOT1 to DOT10 generates a constant integral number of binary signals during one cycle of the clock signal CL1, the halftone dot signals are higher in frequency than the clock signal CL1.

As well known in the art, the halftone dot signals are produced by a method of comparing the image signal Y-IMA with screen pattern signals previously stored in a screen pattern memory SPM which is provided in the dot generator 36. When the level of the image signal Y-IMA is greater than the signal level stored in the memory SPM, the halftone dot signals are set at high levels, while the same are set at low levels in other case. FIG. 8 illustrates exemplary signals which are stored in the screen pattern memory SPM. FIG. 9 illustrates a pattern (50% halftone dots) of an output of the dot generator 36, i.e., an image recorded on the film, which is obtained as the result of comparison of the image signal Y-IMA with the screen pattern signals illustrated in FIG. 8, assuming that the level of the image signal Y-IMA is 2 (constant value).

While the dot generator 36 operates in the aforementioned manner, the dot generator 36 requires an unnegligible prescribed time for starting output of the halftone dot signals DOT1 to DOT10 upon receiving of the image signal Y-IMA in practice. This prescribed time is the aforementioned delay time $\tau$. As shown at FIG. 7(f), therefore, the halftone dot signals DOT1 to DOT10 are inputted in the synthesizing circuit 11 from a point of time t3 (t3=t2+$\tau$). This means that the halftone dot signal producing circuit 30 outputs the as-formed halftone dot signals DOT1 to DOT10 to the synthesizing circuit 11 substantially in response to the second output start signal ENSTD as described later. In order to input the aforementioned edge signals BE and WE in the synthesizing circuit 11 synchronously with the halftone dot signals DOT1 to DOT10, therefore, it is necessary to take the delay time $\tau$ into consideration. This point is further clarified in the following description on the structure and operation of the edge signal producing circuit 40. This also applies to the M, C and Bk separations.

(3-3) Edge Signal Producing Circuit

Figure 4:
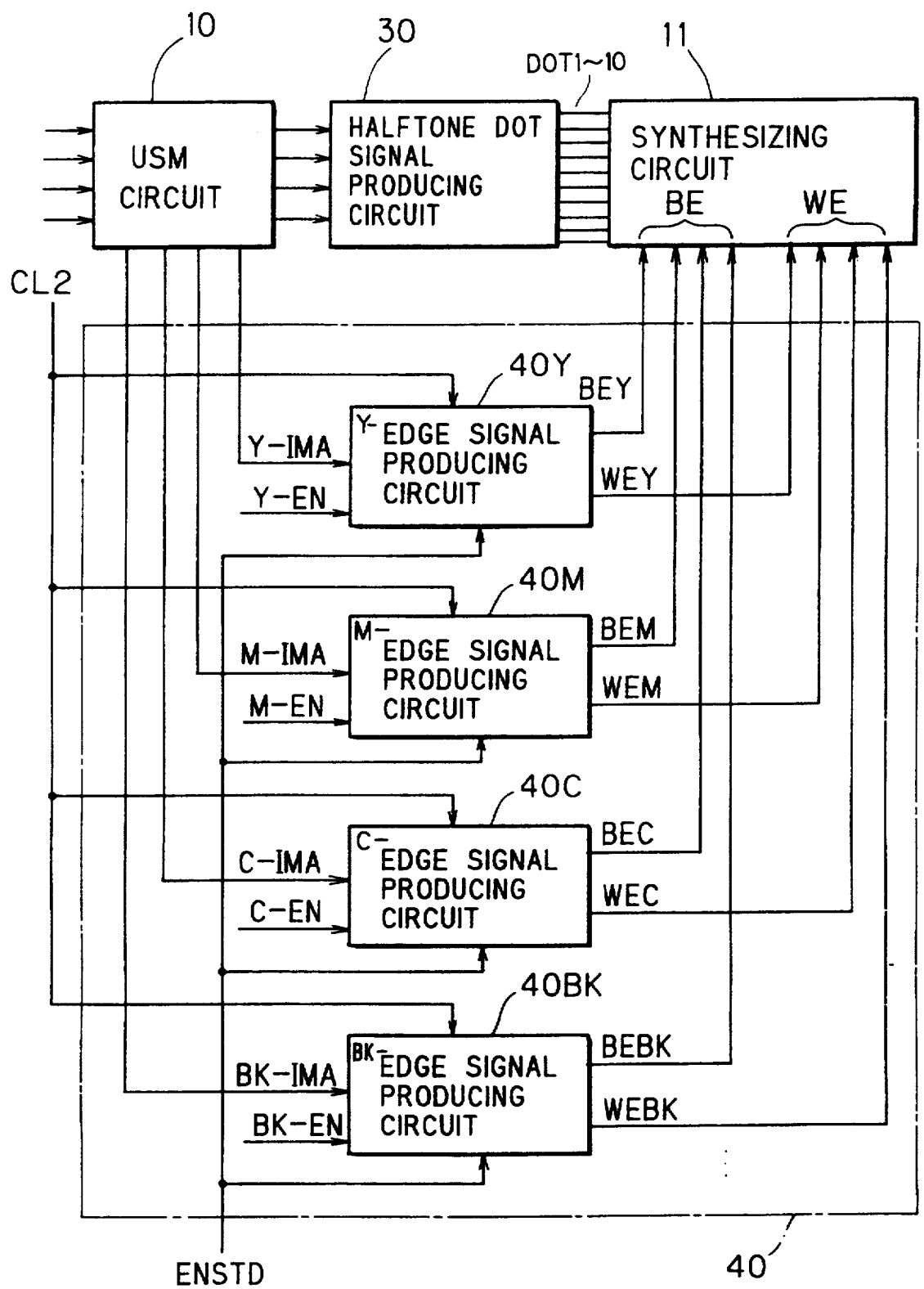
FIG. 4 is a block diagram showing the overall structure of an edge signal producing circuit in relation to peripheral circuits.

FIG. 4 is a block diagram showing the overall structure of the edge signal producing circuit 40 in relation to the peripheral circuits. As shown in FIG. 4, the edge signal producing circuit 40 is formed by four portions of a Y-edge signal producing circuit 40Y, an M-edge signal producing circuit 40M, a C-edge signal producing circuit 40C and a Bk-edge signal producing circuit 40Bk.

The respective image signals Y-IMA to Bk-IMA outputted from the USM circuit 10 are inputted in corresponding ones of the edge signal producing circuits 40Y to 40Bk respectively. The edge signal producing circuits 40Y to 40Bk produce contour signals (BEY, WEY) to (BEBk, WEBk) corresponding to the respective image signals Y-IMA to Bk-IMA in response to the clock signal CL2. The edge signal producing circuits 40Y to 40Bk perform these operations in parallel with each other.

However, the contour signals (BEY, WEY) to (BEBk, WEBk) are outputted at timings which are decided in response to the second output start signal ENSTD applied to the respective edge signal producing circuits 40Y to 40Bk and the corresponding selection signals Y-EN to Bk-EN. In more concrete terms, the Y-edge signal producing circuit 40Y enters an output standby state on a leading edge of the selection signal Y-EN, and thereafter the second output start signal ENSTD so rises that the Y-edge signal producing circuit 40Y outputs the contour signal (BEY, WEY) to the synthesizing circuit 11. Thereafter the selection signal Y-EN falls, to end the output standby state in the Y-edge signal producing circuit 40Y. During this time, the other edge signal producing circuits 40M to 40Bk cannot output the contour signals (BEM, WEM) to (BEBk, WEBk), as a matter of course. Then the selection signal M-EN rises so that the M-edge signal producing circuit 40M in turn enters an output standby state. Thereafter the second output start signal ENSTD again rises so that the M-edge signal producing circuit 40M outputs the contour signal (BEM, WEM). Thereafter the C-edge signal producing circuit 40C and the Bk-edge signal producing circuit 40 Bk successively outputs the contour signals (BEC, WEC) and (BEBk, WEBk) respectively, in a similar manner to the above.

Accordingly, the structure and operation of the Y-edge signal producing circuit 40Y are now typically described in detail. The following description also applies to the remaining edge signal producing circuits 40M to 40Bk.

Figure 5:
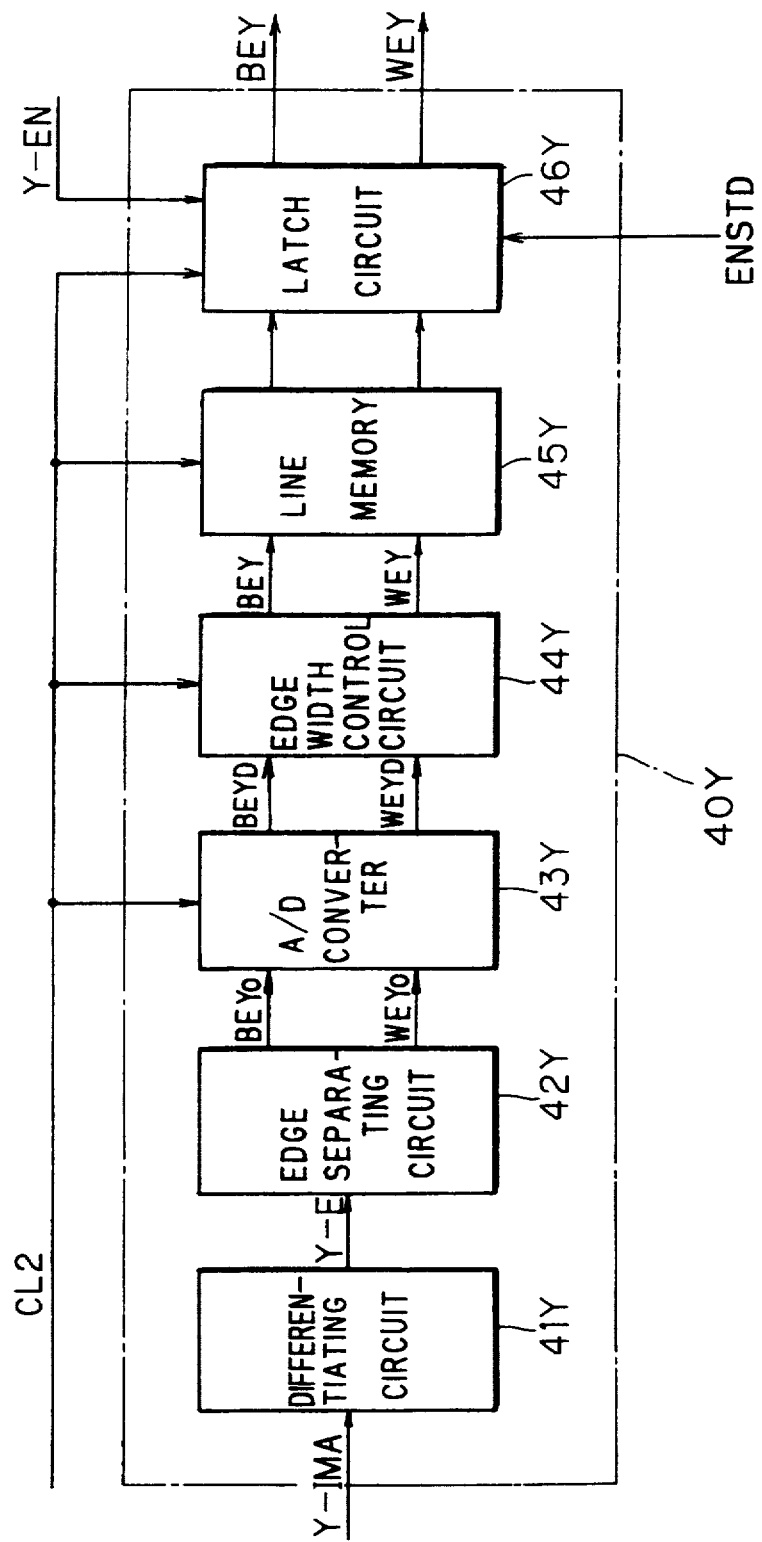
FIG. 5 is a block diagram showing the electrical structure of a Y-edge signal producing circuit.

FIG. 5 is a block diagram illustrating the electrical structure of the Y-edge signal producing circuit 40Y. First, the image signal Y-IMA (analog signal) showing image density of the Y-separation is differentiated by a differentiating circuit 41 which is formed by a resistor, a capacitor and the like, to be converted to a negative signal expressing a black edge when the density is changed from light to dark, while the same is converted to a positive signal expressing a white edge if the density is changed from dark to light. Thus, a contour signal Y-E expressing an edge of the image is obtained.

Figure 6:
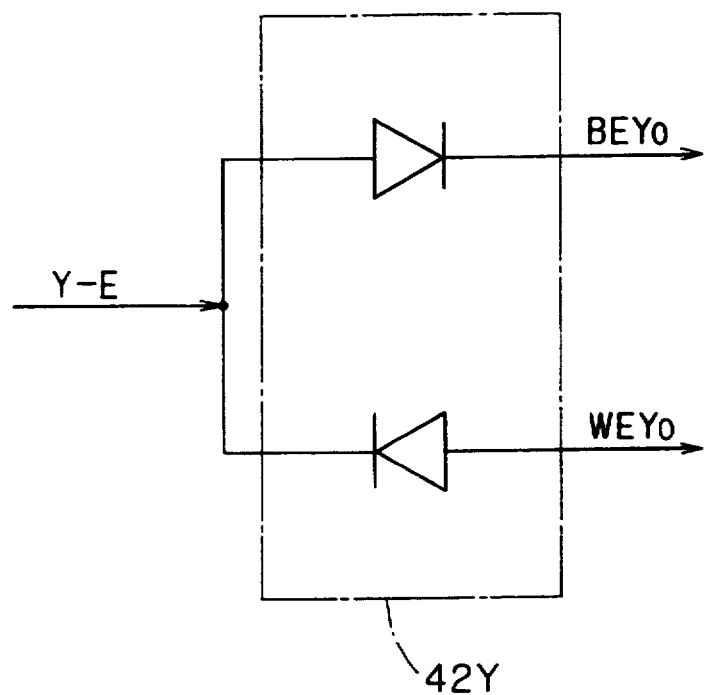
FIG. 6 illustrates the structure of an edge separating circuit.

Then the contour signal Y-E is inputted in an edge separating circuit 42Y, to be separated into a positive signal (corresponding to a white edge) WEY0 and a negative signal (corresponding to a black edge) BEY0 (these signals are generically referred to as a contour signal). As shown in FIG. 6, the edge separating circuit 42Y is formed by two diodes.

Then, the contour signal (BEY0, WEY0) is inputted in an A-D converter 43Y and sampled in the cycle of the clock signal CL2, to be converted to a binary digital signal showing presence/absence of a contour. Since the sampling cycle in the A-D converter 43 is shorter than that in the A-D converter 32 as described above, the resolution of the as-digitalized contour signal (BEYD, WEYD) is higher than that of the image signal Y-IMA digitalized in the halftone dot signal producing circuit 30.

Thereafter the contour signal (BEYD, WEYD) is inputted in an edge width control circuit 44Y, to be expanded or compressed to such a value that the signal level of the contour signal (BEYD, WEYD) corresponds to the magnification (MAG) in response to the clock signal CL2. The expanded or compressed contour signal (BEY, WEY) is stored in a line memory 45Y in synchronization with the clock signal CL2. This line memory 45Y also has memory capacity capable of storing contour signals for several lines.

Thereafter the contour signal (BEY, WEY) being stored in the line memory 45Y is latched in a latch circuit 46Y also at the timing of the clock signal CL2. The latch circuit 46Y outputs the contour signal (BEY, WEY) to the synthesizing circuit 11 in the following system:

First, the selection signal Y-EN is generated at the time t1 (see FIG. 7(c)), whereby the latch circuit 46Y enters an output standby state. Then, the first output start signal ENST is generated at the time t2, but the same is not directly applied to the latch circuit 46Y. Namely, the first output start signal ENST is first inputted in the delay circuit 56, to be then applied to the latch circuit 46Y as the second output start signal ENSTD. This results from consideration of the delay time $\tau$ caused in the dot generator 36 which is provided in the halftone dot signal producing circuit 30, as described above. Therefore, the second output start signal ENSTD is applied to the latch circuit 46Y at the aforementioned time t3 (see FIG. 7(g)). Then, the latch circuit 46T outputs the contour signal (BEY, WEY) in response to the second output start signal ENSTD (see FIG. 7(h)(i)). Consequently, the contour signal (BEY, WEY) and the halftone dot signals DOT1 to DOT10 are simultaneously inputted in the synthesizing circuit 11.

(3-4) Synthesizing Circuit

The synthesizing circuit 11 logically operates the contour signal (BEY, WEY) and the halftone dot signals DOT1 to DOT10, to produce the exposure signals EX1 to EX10. However, the as-executed logical operation is varied with the type of the outputted film, i.e., a halftone negative film or a halftone positive film. This is now described in detail.

(1) When a halftone positive film is outputted, the logical operation is carried out along the following logical expression (1):

$$EX = BE + (\overline{WE} \cdot DOT) \tag{1}$$

Symbol DOT appearing in the above expression (1) represents one of the halftone dot signals DOT1 to DOT10, while symbol EX represents an exposure signal corresponding to the halftone dot signal represented by symbol DOT. The meaning of the above expression (1) is as follows:

In order to prevent a line break in output of a halftone positive film, it is necessary to void a white portion of the original while adding a black edge to a black line portion. If a halftone dot signal DOT includes a white edge, therefore, it is necessary to erase the halftone dot signal DOT included in the white edge region. The AND operation of an inverted white edge signal WE and the halftone dot signal DOT appearing in the right parenthesis of the above expression (1) is carried out for this. Then, the logical product of the result of the AND operation and the black edge signal BE is taken by an OR operation of the result of the AND operation in the parenthesis and the black edge signal BE. On the basis of the above logical expression (1), therefore, a black edge portion is exposed with no regard to the halftone dot signal and a white edge portion is not exposed with no regard to the halftone dot signal DOT, while a region other than the black and white edge portions is normally exposed in accordance with the halftone dot signal DOT.

(2) When a halftone negative film is outputted, the logical operation is carried out along the following logical expression (2):

$$EX = WE + (\overline{BE} \cdot DOT) \tag{2}$$

The meaning of the expression (2) is also understood in a similar manner to the expression (1). When a halftone negative film is outputted, it is possible to link lines corresponding to a black line of the original by voiding a portion of the original provided with the black line on the outputted film. Thus, the halftone dot signal DOT and an inverted black edge signal BE are first subjected to AND operation, to erase the halftone dot signal DOT included in a black edge region. Further, the logical sum of the result of the AND operation and the white edge signal WE is taken. This operation is achieved by an OR operation of these signals.

On the basis of the logical expression (2), therefore, a white edge portion is exposed with no regard to the halftone dot signal DOT and a black edge portion is not exposed with no regard to the halftone dot signal DOT, while a region other than the black and white edge portions is normally exposed in accordance with the halftone dot signal DOT. Considering the two cases of outputting halftone positive and negative films by combining the expressions (1) and (2), an exposure signal EX is expressed as follows:

$$EX = NP \cdot \{BE + (\overline{WE} \cdot DOT)\} + \overline{NP} \cdot \{WE + (\overline{BE} \cdot DOT)\} \tag{3}$$

Figure 10:
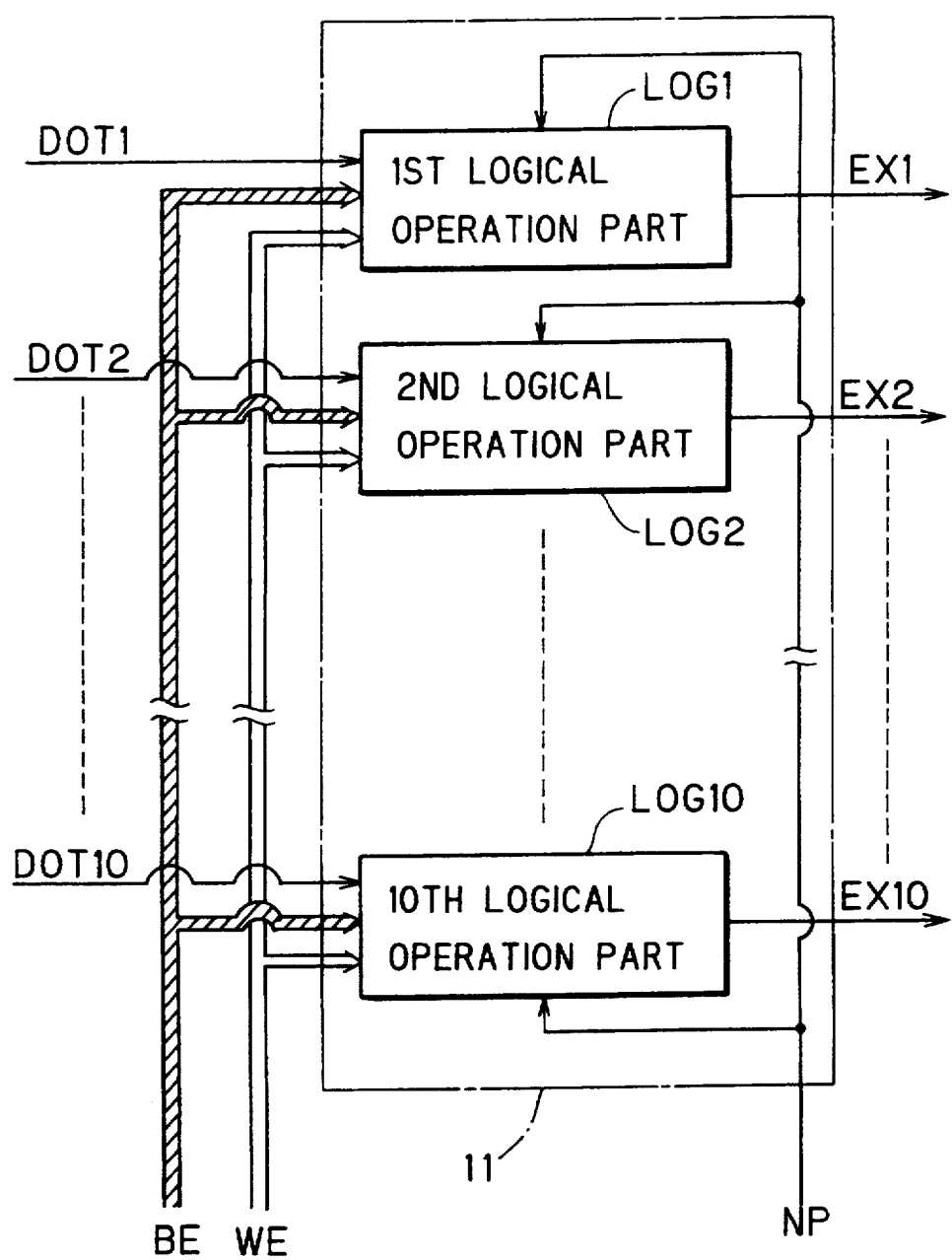
FIG. 10 is a block diagram illustrating the structure of a synthesizing circuit.
Figure 11:
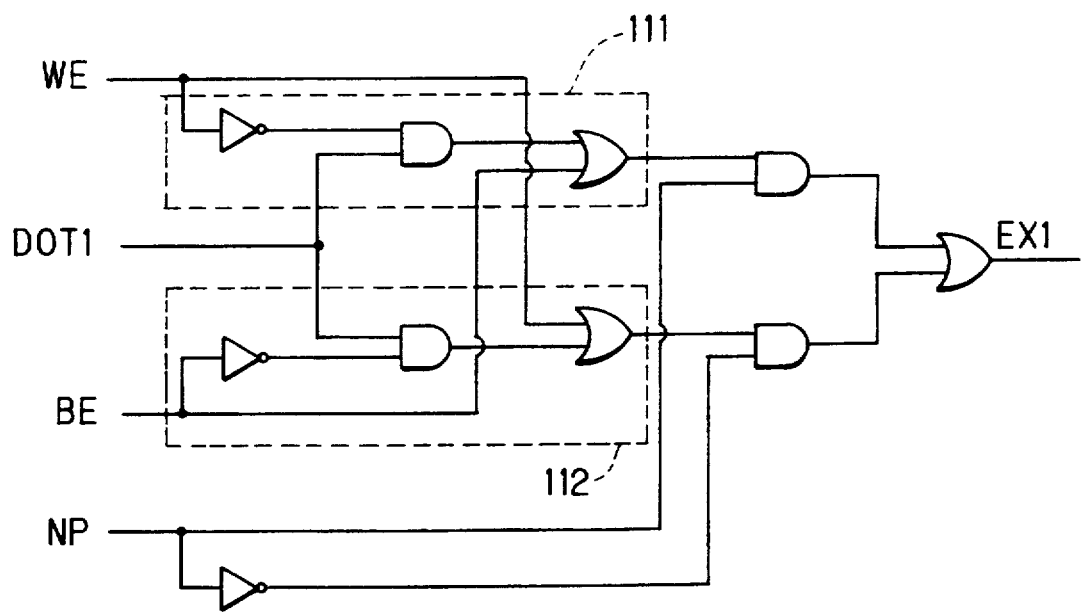
FIG. 11 is a block diagram illustrating the structure of a logical operation part.

The system of the logical operation is as described above. FIGS. 10 and 11 illustrate an exemplary synthesizing circuit 11 which is formed on the basis of this system. FIG. 10 is a block diagram showing the overall structure of the synthesizing circuit 11. As shown in FIG. 10, the synthesizing circuit 11 is formed by 10 logical operation parts LOG1 to LOG10 in response to the halftone dot signals DOT1 to DOT10 respectively. The black and white edge signals BE and WE and the negative/positive signal NP are also applied to the respective logical operation parts LOG1 to LOG10 with the corresponding halftone dot signals. The logical operation parts LOG1 to LOG10 are identical in electrical structure to each other.

FIG. 11 illustrates an exemplary structure of the logical operation part LOG1, as a typical example of the structures of the logical operation parts LOG1 to LOG10. FIG. 11 shows a logic circuit which is formed to be capable of executing the logical operation shown in the expression (3), and a portion for executing the logical operation shown in the expression (1) corresponding to a logic circuit 111 which is formed by an inverter, an AND circuit and an OR circuit, while a portion for executing the logical operation shown in the expression (2) corresponding to a logic circuit 112 which is formed by an inverter, an AND circuit and an OR circuit.

Figure 12:
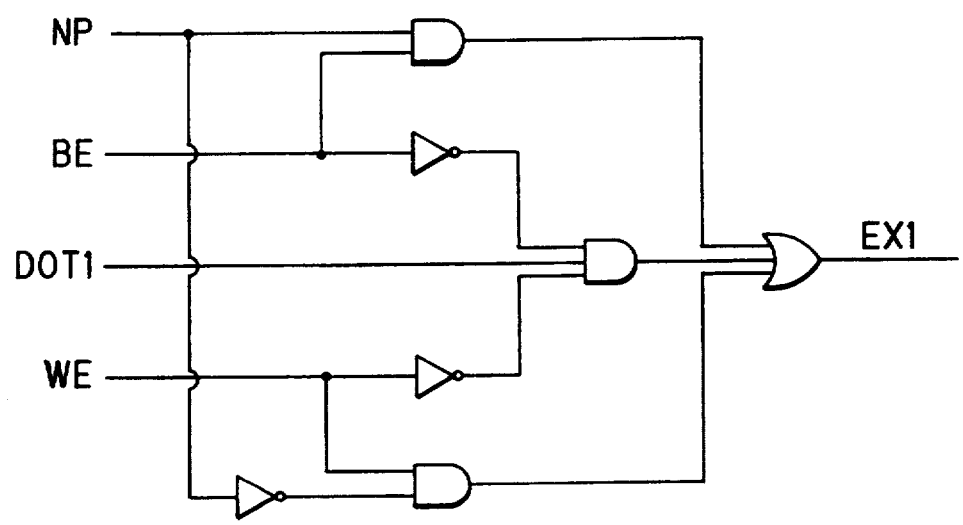
FIG. 12 is a block diagram illustrating the structure of a logical operation part.

The expression (3) can be rewritten in the following logical expression (4), as shown in FIG. 12 in the form of a logic circuit:

$$EX = NP \cdot BE + \overline{NP} \cdot WE + DOT \cdot \overline{BE} \cdot \overline{WE} \tag{4}$$

The exposure signals EX1 to EX10 outputted from the synthesizing circuit 11 in the case of a Y separation output is shown at FIG. 7(j).

(4) Image Output Part

As shown in FIG. 1, the image output part is formed by an AOM (acoustic optical modulation) driver 12, an exposure head 13 and an output drum 4. The output drum 4 is rotated in a main scanning direction X2 by a moving mechanism (not shown). This rotation is also controlled by the CPU 53. A rotary encoder 6 is provided on an end of a rotation axis of the output drum 4 to generate a pulse signal, which is transmitted to the CPU 53 through the input interface 52. The film 2 is stuck on the output drum 2.

On the other hand, the exposure head 13 is also scanned in a subscanning direction Y2 by a moving mechanism (not shown). As is well known in the art, this exposure head 13 has a splitter for diving an optical beam outgoing from a laser oscillator into 10 optical beams and a 10-channel AOM (acoustic optical modulator) which can individually modulate the 10 optical beams respectively. Thus, the exposure head 13 moves in the subscanning direction Y2 while applying the 10 optical beams onto the film 5. An AOM driver 12 generically indicates a set of 10 AOM drivers, which are connected to corresponding AOMs respectively.

The exposure signals EX1 to EX10 outputted from the synthesizing circuit 11 are inputted in the corresponding AOM drivers 12 respectively, to be applied to the corresponding AOMs as AOM driving signals. Consequently, the 10 optical beams in the exposure head 13 are on-off controlled by the exposure signals EX1 to EX10 respectively to be applied to the film 5, thereby forming a halftone dot image on the film 5.

The structures and operations of the respective parts are as described above. A result obtained when an image signal is actually expressed in halftone dots with the color scanner shown in FIG. 1 is now described.

Figures 13, 14:
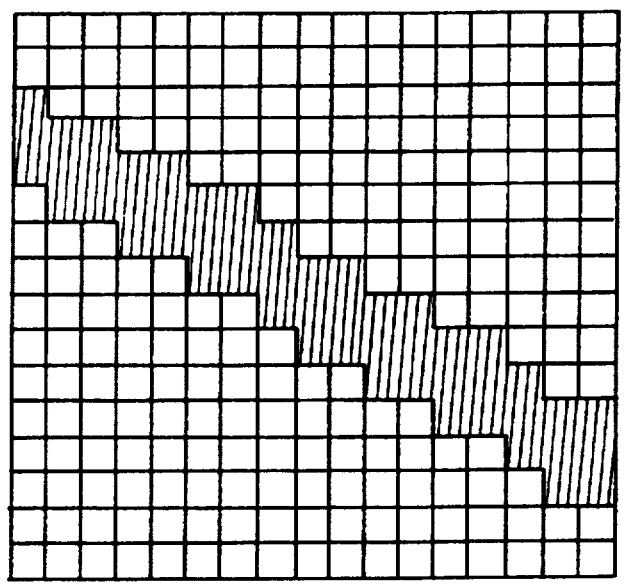
FIG. 13 is a diagram showing an image to be recorded.
FIG. 14 is a diagram showing a halftone dot image obtained upon exposure with no synthesis of contour signals with halftone signals.

FIG. 13 illustrates an image to be recorded, with thin lines. FIG. 14 illustrates a halftone dot image which is obtained on the assumption that the read head 8 reads the aforementioned image to expose the film 5 without synthesizing the as-obtained halftone dot signals DOT1 to DOT10 with the contour signal (BE, WE). In other words, FIG. 14 corresponds to a halftone dot image which is formed by a conventional method. It is clearly understood from FIG. 14 that a line break is caused when the AOMs are directly modulated by the halftone dot signals DOT1 to DOT10 in all regions including edge portions. It is also understood that such a line break is remarkably caused as the thin lines are reduced in width. Numerals appearing in FIG. 14 denote values of screen pattern signals.

Figure 15:
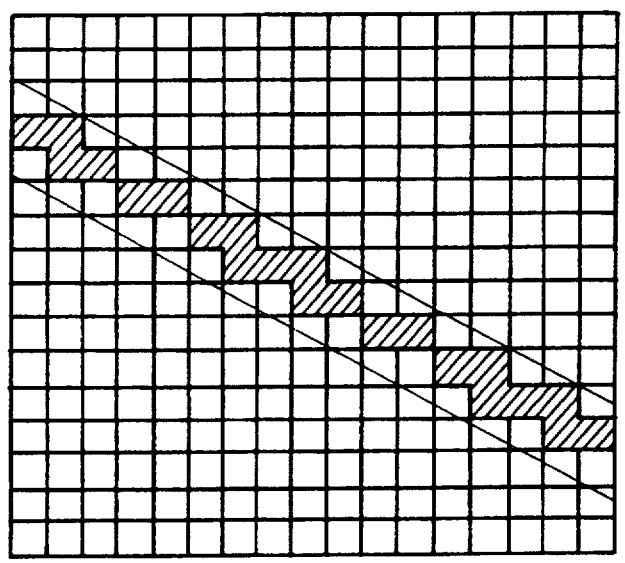
FIG. 15 is a diagram typically showing contour signals.
Figure 16:
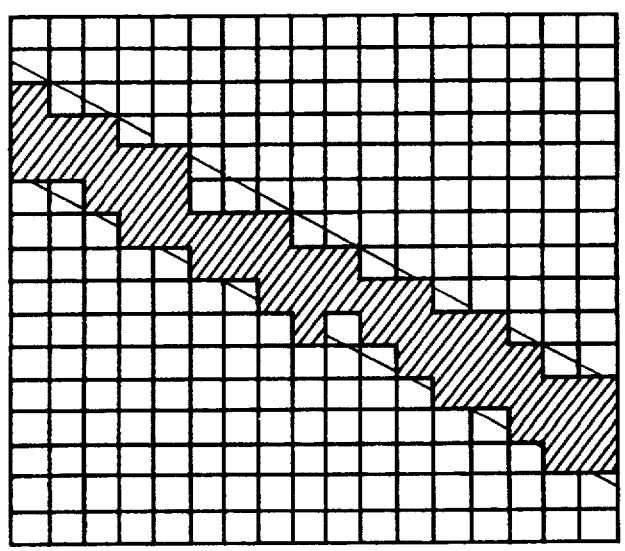
FIG. 16 is a diagram showing a halftone dot image obtained by synthesizing contour signals with halftone dot signals.

On the other hand, FIG. 15 typically illustrates contour signals produced from the image shown in FIG. 13. Further, FIG. 16 shows a halftone dot image which is formed by synthesizing the contour signals and the halftone dot signals DOT1 to DOT10. It is clearly understood from FIG. 16 that no line break is caused in the recorded image. Namely, it is easily understood that a line break phenomenon can be prevented by synthesizing the halftone dot signals with contour signals and modulating the AOMs by the synthetic signals.

Figure 17:
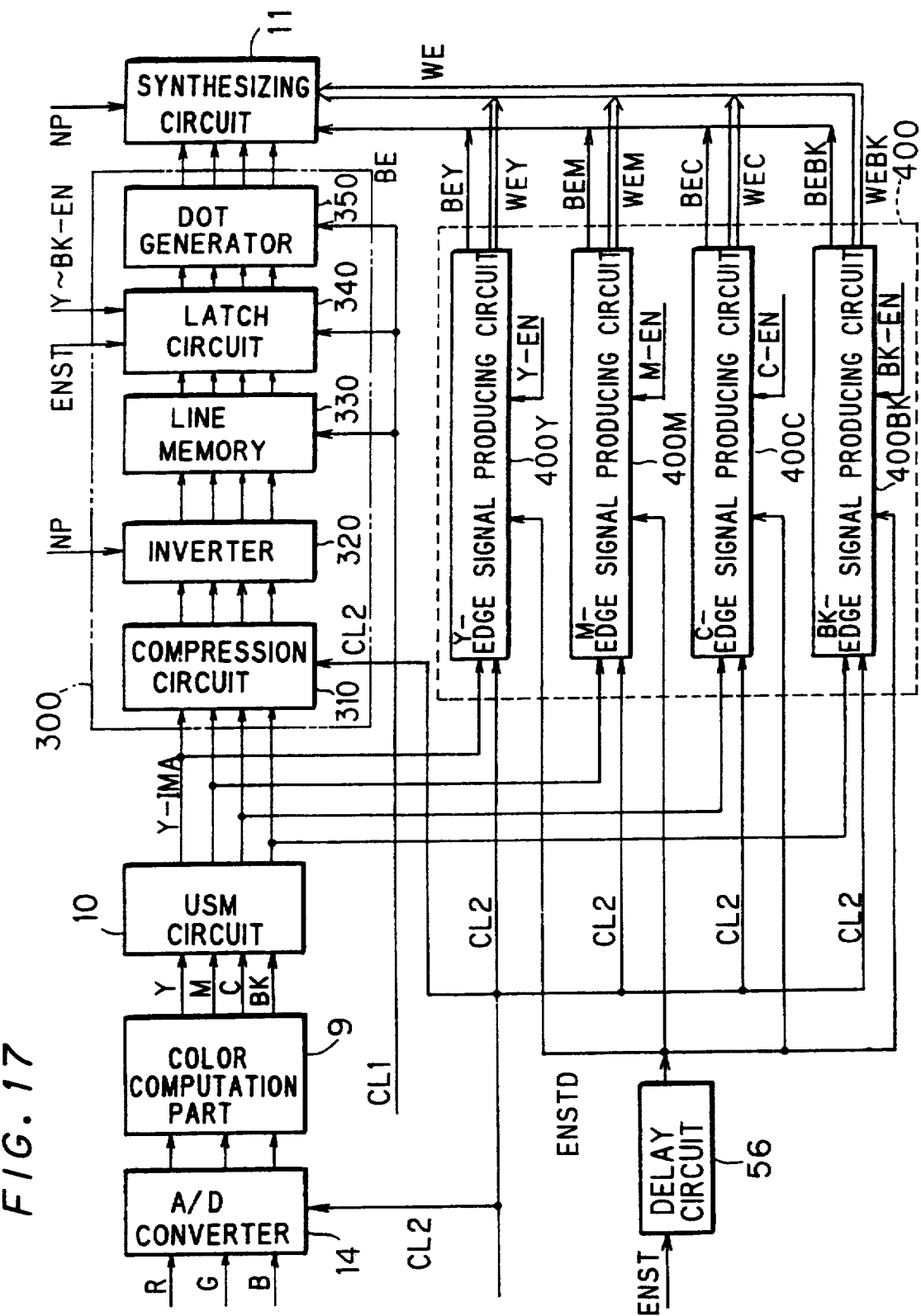
FIG. 17 is a block diagram typically showing the electrical structure of an image processing part of a color scanner according to another preferred embodiment of the present invention.

FIG. 17 is a block diagram typically showing the electrical structure of an image processing part in a color scanner according to another preferred embodiment of the present invention. Referring to FIG. 17, portions other than the image processing part, i.e., an image input part, a control part and an image output part are omitted since the same are identical to those of the color scanner shown in FIG. 1. This scanner is different from that shown in FIG. 1 in a point that RGB signals which are outputted from a read head 8 are first converted to digital signals by an A-D converter 14, to be subjected to a series of image processing operations. Therefore, the image processing part of this scanner is slightly different in structure from that of the scanner shown in FIG. 1. This point is now described in due order.

First, the A-D converter 14 sample-and-holds the RGB signals in a sampling cycle corresponding to the cycle of a second clock signal CL2, and digitalizes the sample-and-held RGB signals by a comparator provided therein. Thereafter the digitalized RGB signals are converted to Y, M, C and Bk signals (masking) by a color computation part 9, and contour-enhanced (unsharp masking) by a USM circuit 10, while operations similar to those in the scanner shown in FIG. 1 are carried out in these processing steps, except the difference between digital and analog signals. The USM circuit 10 is adapted to carry out contour enhancement on the basis of the Y, M, C and Bk signals (digital signals), and requires no unsharp signal U.

Since input image signals Y-IMA to Bk-IMA are digital signals, a halftone dot signal producing circuit 300 provided on this scanner has the following structure:

First, the image signals Y-IMA to Bk-IMA are inputted in a compression circuit 310, so that the information quantities of the image signals Y-IMA to Bk-IMA are compressed or reduced at the timing of the second clock signal CL2. This processing itself is adapted to change the resolution of the image signals Y-IMA to Bk-IMA in compliance with the resolution (e.g., 175 lines per inch) tier exposing the film 5. In more concrete terms, this processing is achieved by averaging the image signals Y-IMA to Bk-IMA respectively.

Then, the compressed image signals Y-IMA to Bk-IMA are inputted in an inverter 320, to be directly outputted or inverted in response to a negative/positive signal NP. When the negative/positive signal NP outputs an indication for outputting a halftone negative film, for example, the inverter 32 outputs inverted image signals Y-IMA to Bk-IMA. Since the operation after such output from the inverter 320 is identical to that described above with reference to the scanner shown in FIG. 1, redundant description is omitted.

On the other hand, an edge signal producing circuit 400 is formed by elements of a Y-edge signal producing circuit 400Y, an M-edge signal producing circuit 400M, a C-edge signal producing circuit 400C and a Bk-edge signal producing circuit 400Bk in correspondence to the respective image signals Y-IMA to Bk-IMA, as illustrated in FIG. 17. In this point, the edge signal producing circuit 400 is identical to the edge signal producing circuit 40 shown in FIG. 1. However, the edge signal producing circuits 400Y to 400Bk are different in structure from the edge signal producing circuits 40Y to 40Bk, since the input signals are digital signals. The structure and operation of the Y-edge signal producing circuit 400Y is now described as a typical example, to clarify such difference.

Figure 18:
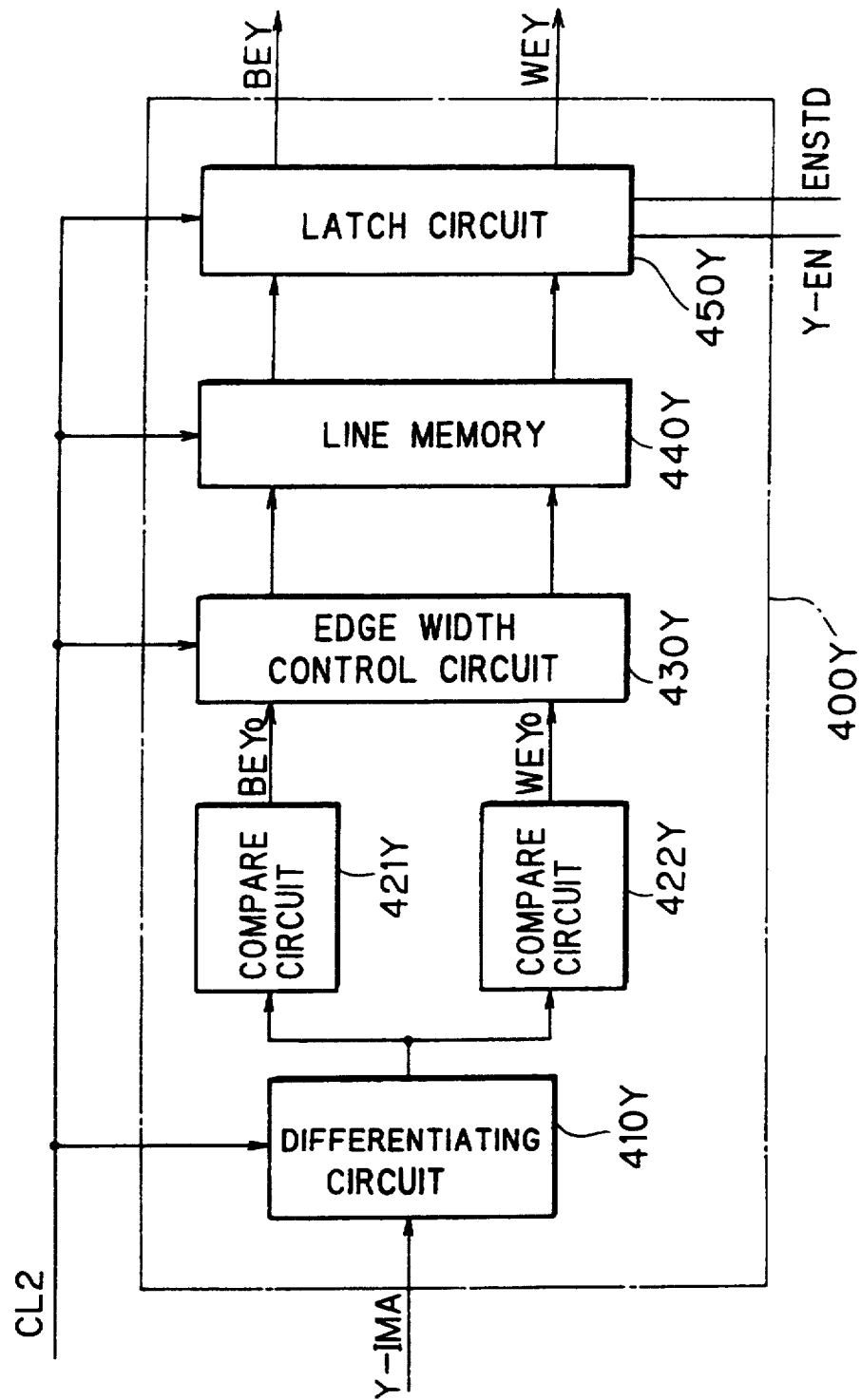
FIG. 18 is a block diagram showing the structure of a Y-edge signal producing circuit.

FIG. 18 is a block diagram showing the structure of the Y-edge signal producing circuit 400 Y. As shown in FIG. 18, the Y-edge signal producing circuit 400Y is formed by a differentiating circuit 410Y, compare circuits 421Y and 422Y, an edge width control circuit 430Y, a line memory 440Y and a latch circuit 450Y. Among these circuits, the edge width control circuit 430Y, the line memory 440Y and the latch circuit 450Y correspond to the edge width control circuit 44Y, the line memory 45Y and the latch circuit 46Y shown in FIG. 5 respectively, and hence redundant description is omitted.

First, the differentiating circuit 410Y differentiates the digitalized image signal Y-IMA, by executing the following operation:

Assuming that symbols Dxy and Exy represent the image signal Y-IMA having position coordinates (x, y) in a coordinate system which is supposed with respect to an original 2 and its differential signal, the differential signal Exy is obtained as follows:

$$E_{XY} = 8D_{XY} - (D_{X-1\ Y-1} + D_{X-1\ Y} + D_{X-1\ Y+1} + D_{X\ Y-1} + D_{X\ Y+1} + D_{X+1\ Y-1} + D_{X+1\ Y} + D_{X+1\ Y+1})$$

Figure 19:
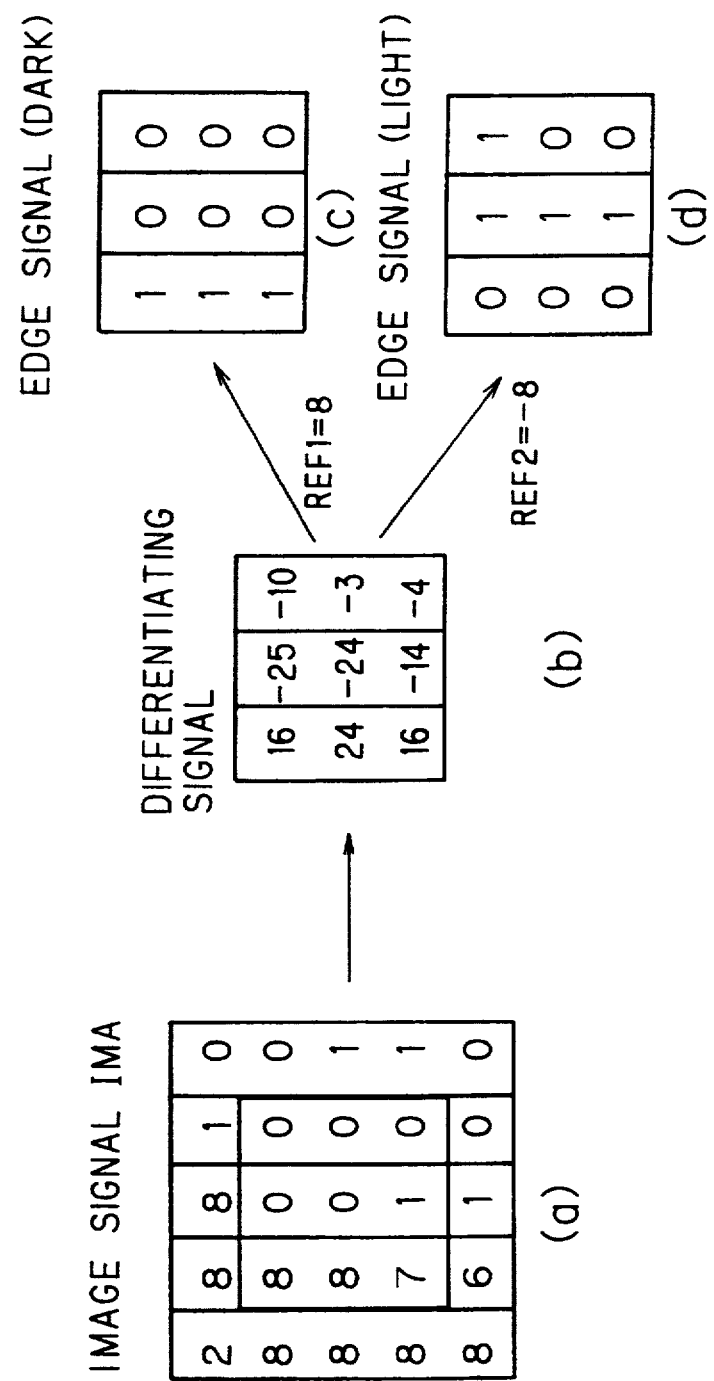
FIG. 19 is a diagram showing exemplary processes in a differentiating circuit and a compare circuit.

Then, the differential signal Exy is inputted in the compare circuits 421Y and 422Y, to be compared with reference values REF1 and REF2 which are previously set in the compare circuits 421Y and 422Y respectively. As the result of this compare processing, the compare circuit 421 detects the contour on a high density side, to output the result as a black edge signal BEY0. On the other hand, the compare circuit 422Y detects the contour on a low density side, to output the result as a white edge signal WEY0. FIG. 19 shows exemplary processing operations in the differentiating circuit 410Y and the compare circuits 421Y and 422Y.

FIG. 19(a) shows values of the image signals IMA in respective positions. FIG. 19(b) shows differential signals Exy obtained with respect to the image signals IMA appearing in a region enclosed by thick lines in FIG. 19(a). Further, FIGS. 19(c) and 19(d) show black and white edge signals BEY0 and WEY0 which are obtained when the reference values REF1 and REF2 are set at "8" and "−8" respectively.

In addition to the above expression, various arithmetic operations may be employed in order to calculate the differential signal Exy, as follows:

$$E_{XY} = D_{XY} - \tfrac{1}{4} \times (D_{X-1\ Y} + D_{X+1\ Y} + D_{X\ Y-1} + D_{X\ Y+1})$$

or $$E_{XY} = D_{XY} - 1/6 \times (D_{X-1\ Y} + D_{X+1\ Y} + D_{X\ Y-1} + D_{X\ Y+1}) - 1/12 \times (D_{X-1\ Y-1} + D_{X-1\ Y+1} + D_{X+1\ Y-1} + D_{X+1\ Y+1})$$

The present invention has been described with reference to application to color scanners. However, the present invention is not restricted to a color original, but is also applicable to a halftone dot image produced from a monochrome original, as a matter of course.

Figure 20:
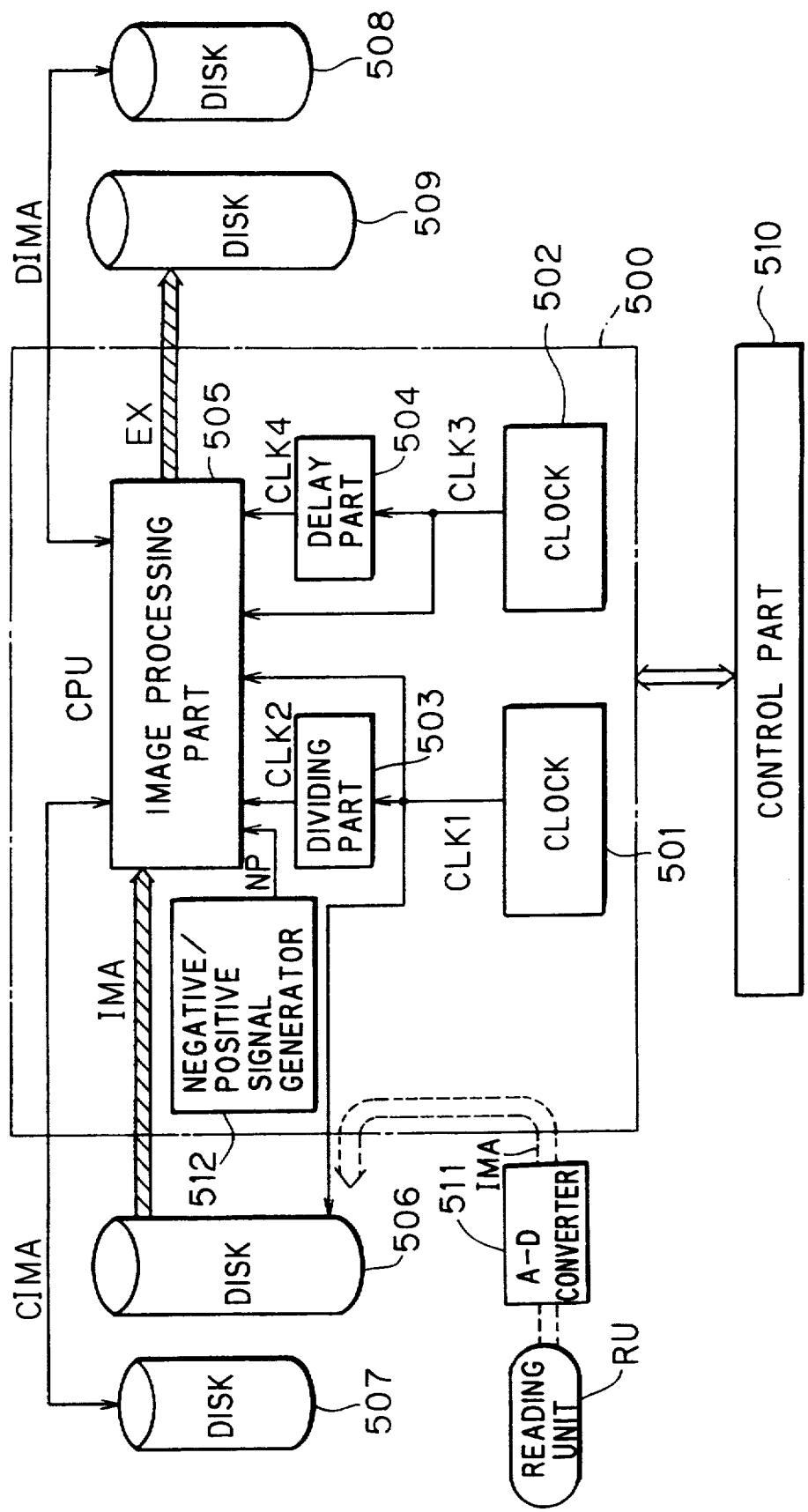
FIG. 20 is a block diagram showing still another preferred embodiment of the present invention.
Figure 22:
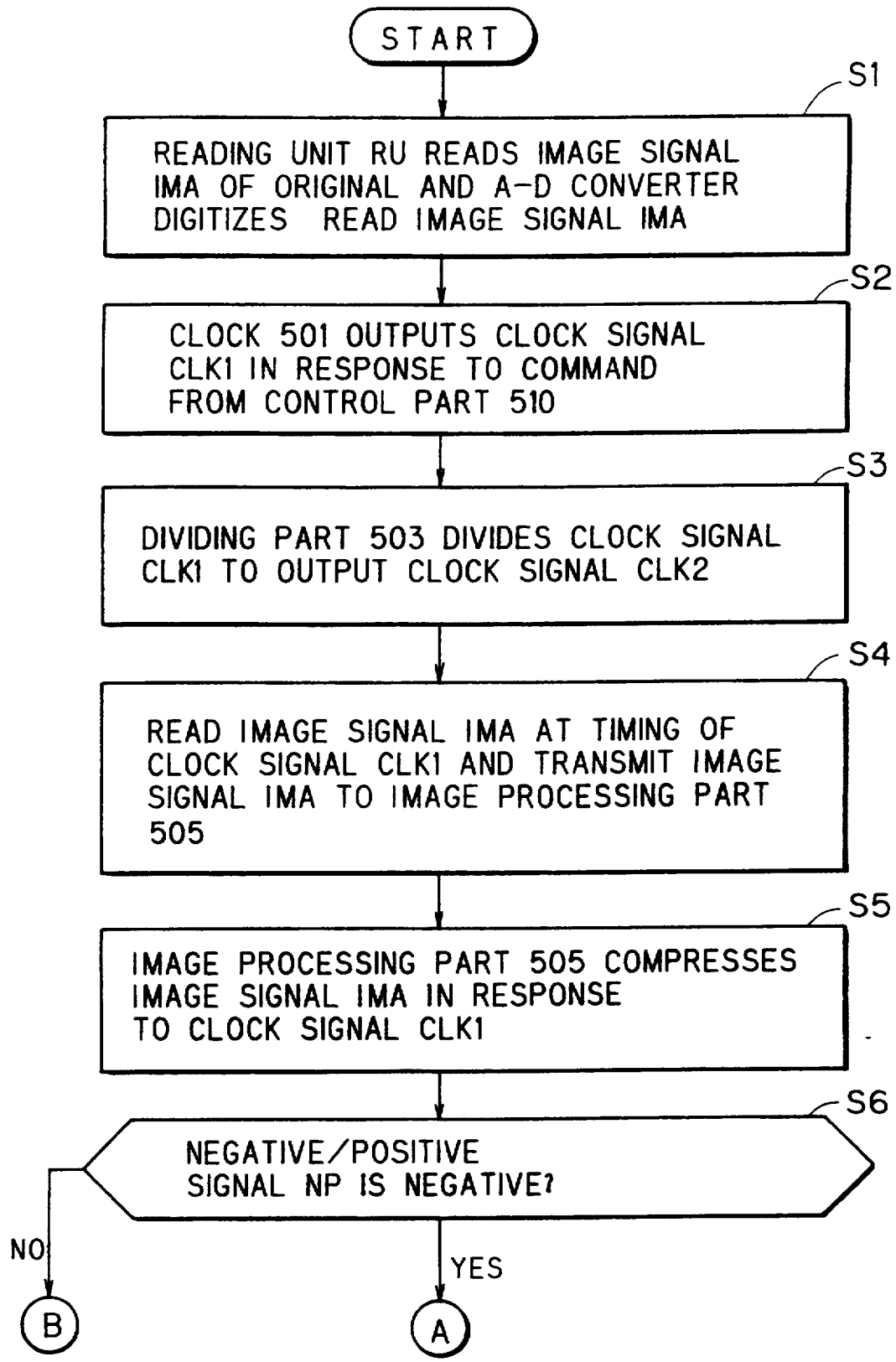
FIGS. 22 to 27 are flow charts showing the function of a CPU.
Figure 23:
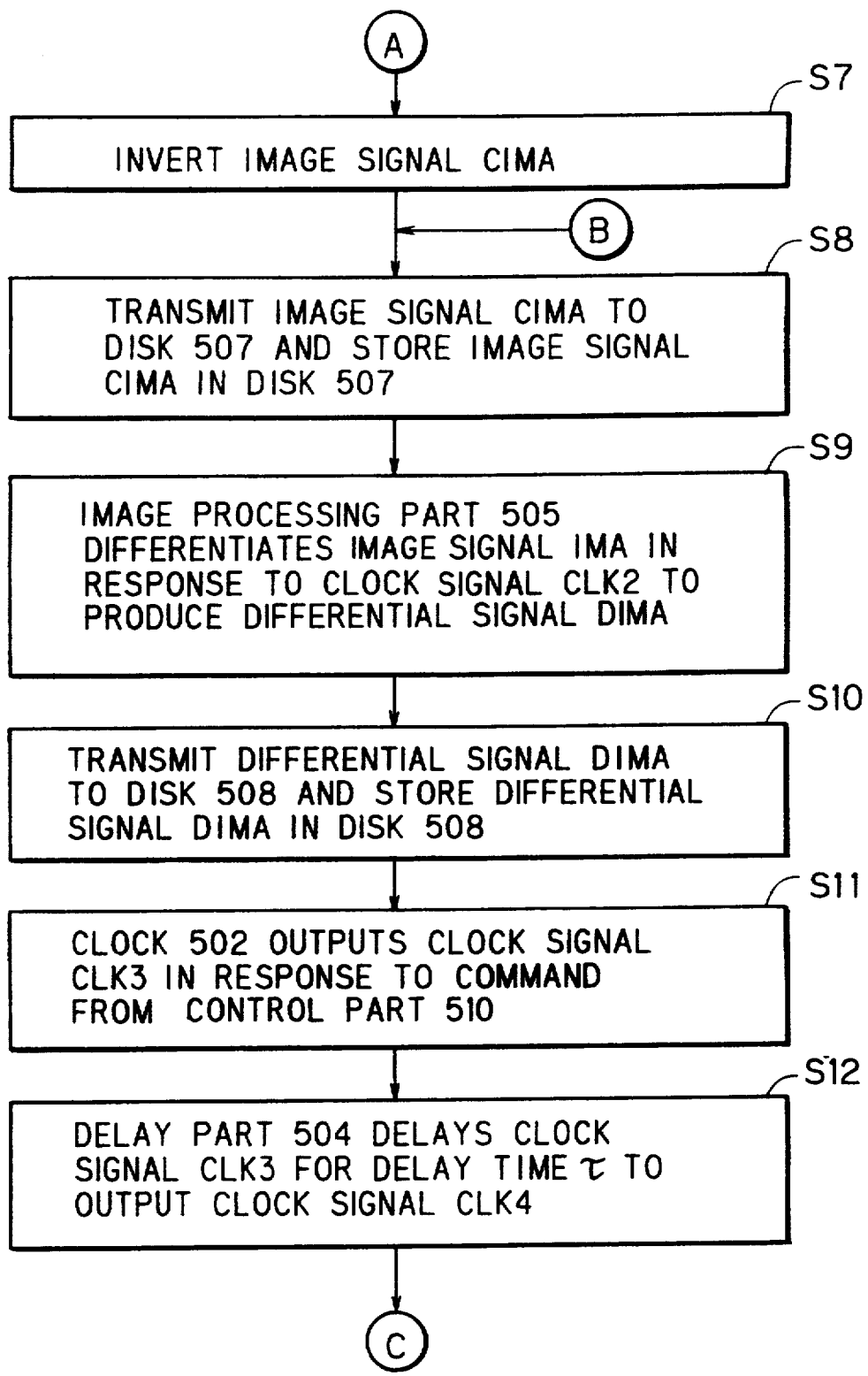
Figure 24:
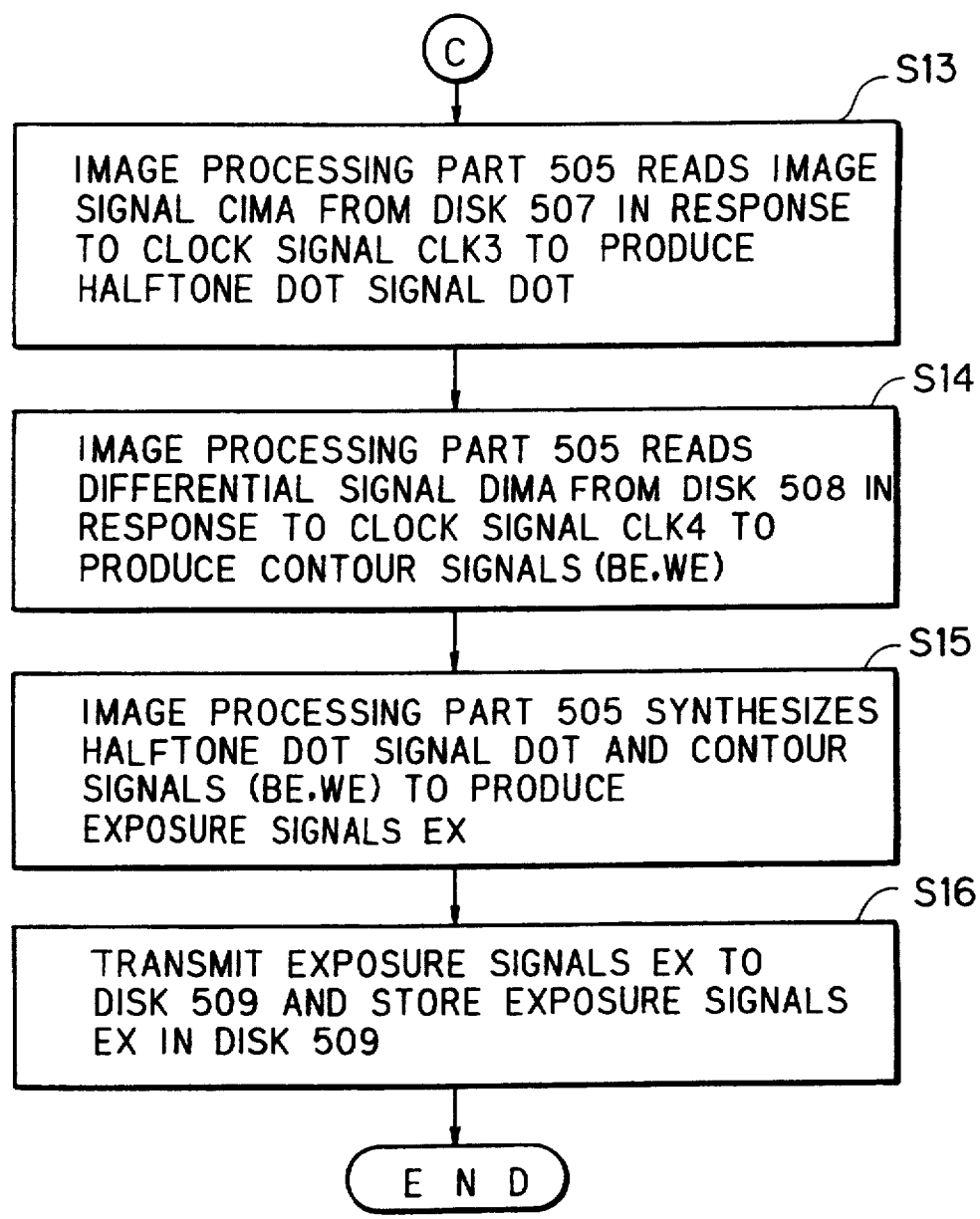

FIG. 20 is a diagram showing still another preferred embodiment of the present invention, which is adapted to perform the series of processing operations in the image processing part of the scanner shown in FIG. 17 by a CPU 500 in a software manner (see FIGS. 22 to 24).

First, a reading unit RU of a CCD camera or the like previously reads an image of an original, and converts the signals to digital signals. The as-read image signals IMA are stored in a disk 506 through the CPU 500 (step S1). This operation of the CPU 500 is controlled by a control part 510.

As shown in FIG. 20, the CPU 500 has two clocks 501 and 502. The clock 501 generates a clock signal CLK1 in response to a command from the control part 510 (step S2). This clock signal CLK1 is inputted in the disk 506, an image processing part 505 and a dividing part 503. Therefore, the image signals IMA are read out from the disk 506 at the timing of this clock signal CLK1, to be inputted in the image processing part 505 (step S4). On the other hand, the clock signal CLK1 inputted in the dividing part 503 is divided into a clock signal CLK2, to be inputted in the image processing part 505 (step S3). This clock signal CLK2 corresponds to the clock signal CL1 in the scanner shown in FIG. 17. The clock signal CLK1 directly inputted in the image processing part 505 also corresponds to the clock signal CL2 in the scanner shown in FIG. 17.

On the other hand, the clock 502 generates a clock signal CLK3 in response to a command from the control part 510 (step S11). This clock signal CLK3 is directly inputted in the image processing part 505, while the same is also inputted in a delay part 504. The clock signal CLK3 directly inputted in the image processing part 505 corresponds to the first output start signal ENST in the scanner shown in FIG. 17. On the other hand, the clock signal CLK3 inputted in the delay part 504 is delayed by a delay time τ, to be inputted in the image processing part 505 as a clock signal CLK4 (step S12). Thus, the clock signal CLK4 serves as a clock corresponding to the second output start signal ENSTD in the scanner shown in FIG. 17.

The image processing part 505 has a processing function corresponding to that of the image processing part in the scanner shown in FIG. 17. In this embodiment, however, a disk 507 serves as a portion for temporarily storing signals of the line memory 330 and the latch circuit 340 in the halftone dot signal producing circuit 300 of the aforementioned image processing part, while a disk 508 serves as a portion for temporarily storing signals of the line memory 440Y and the latch circuit 450Y in the edge signal producing circuit 400 etc. of the aforementioned image processing part.

Therefore, the image processing part 505 performs processing such as compression on the image signals IMA which are read in response to the dock signal CLK1 as described above (steps S5 to S7), to store the signals in the disk 507 (step S8). The image processing part 505 further calculates differential signals etc. from the image signals IMA in response to the clock signal CLK2 (step S9), to store the signals in the disk 508 (step S10). In addition, the image processing part 505 reads signals from the disk 507 in response to the clock signal CLK3 to produce halftone dot signals (step S13), while reading signals from the disk 508 in response to the clock signal CLK4 for producing a contour signal formed by black and white edges (step S14). The image processing part 505 further synthesizes the halftone dot signals with the contour signal to produce exposure signals EX (step S15), thereby transferring and storing the same to and in the disk 509 (step S16). Thus, it is possible to appropriately read the exposure signals EX stored in the disk 509 to freely reproduce the image.

Figure 21:
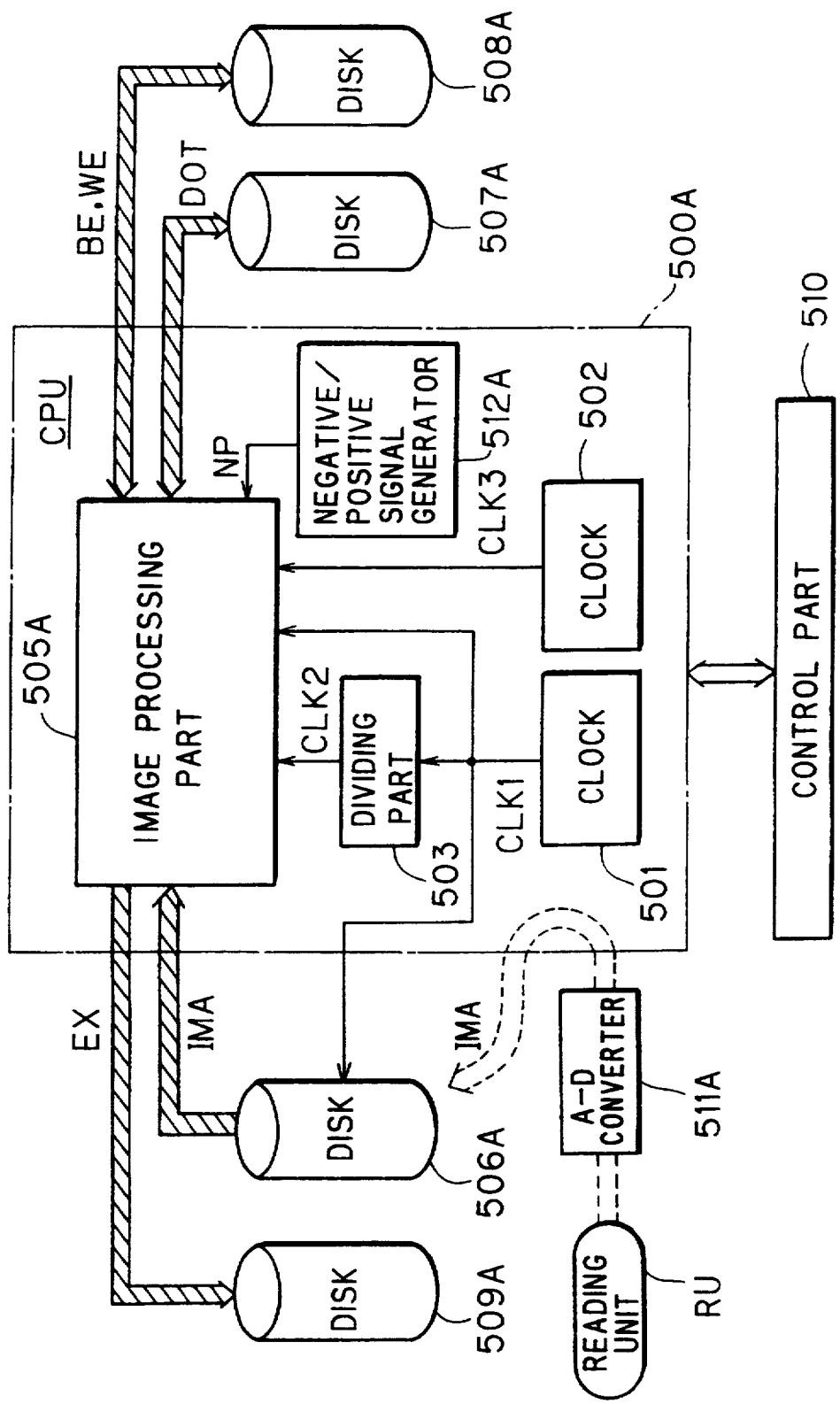
FIG. 21 is a block diagram showing a further preferred embodiment of the present invention.
Figure 25:
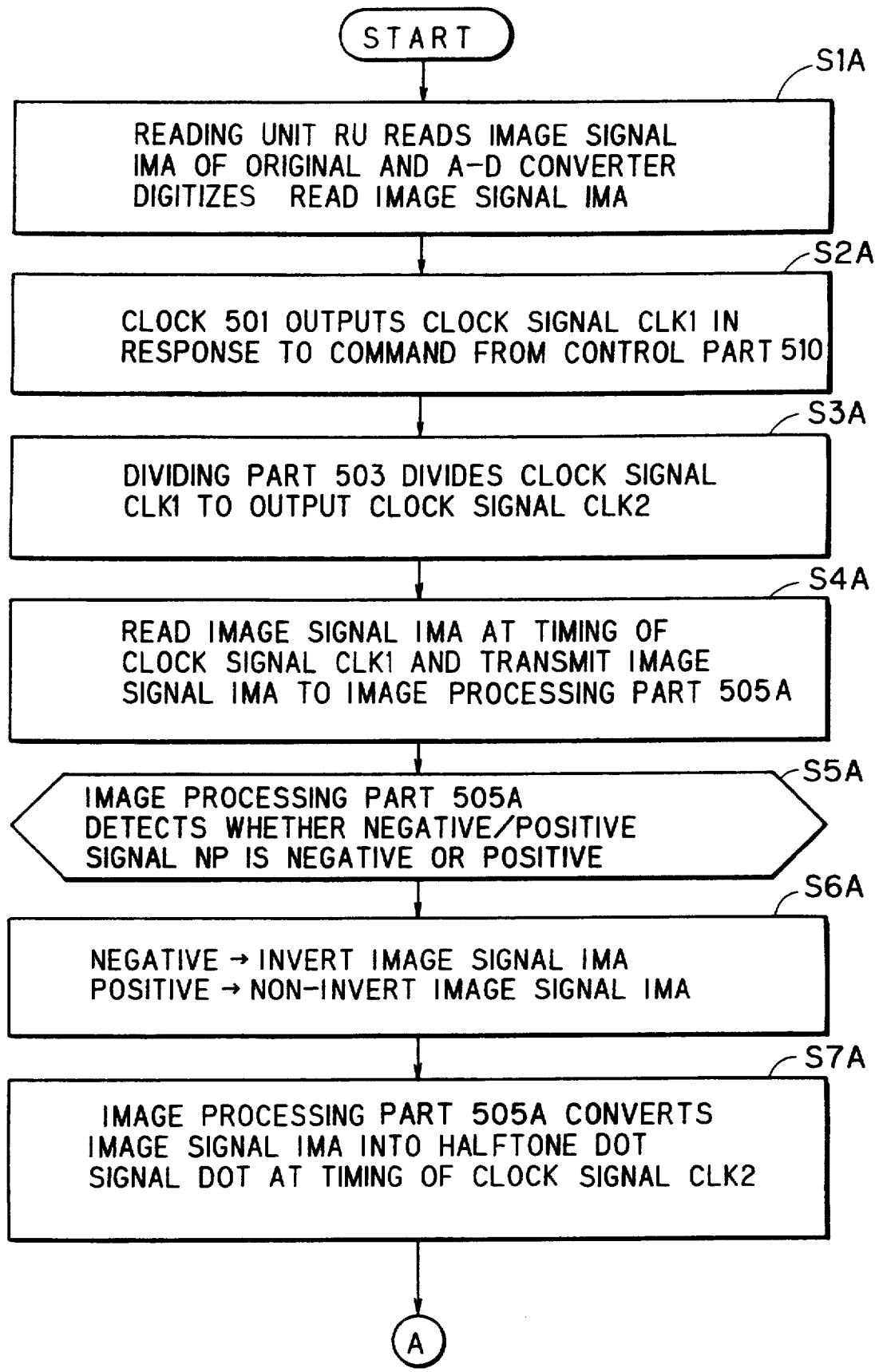
Figure 26:
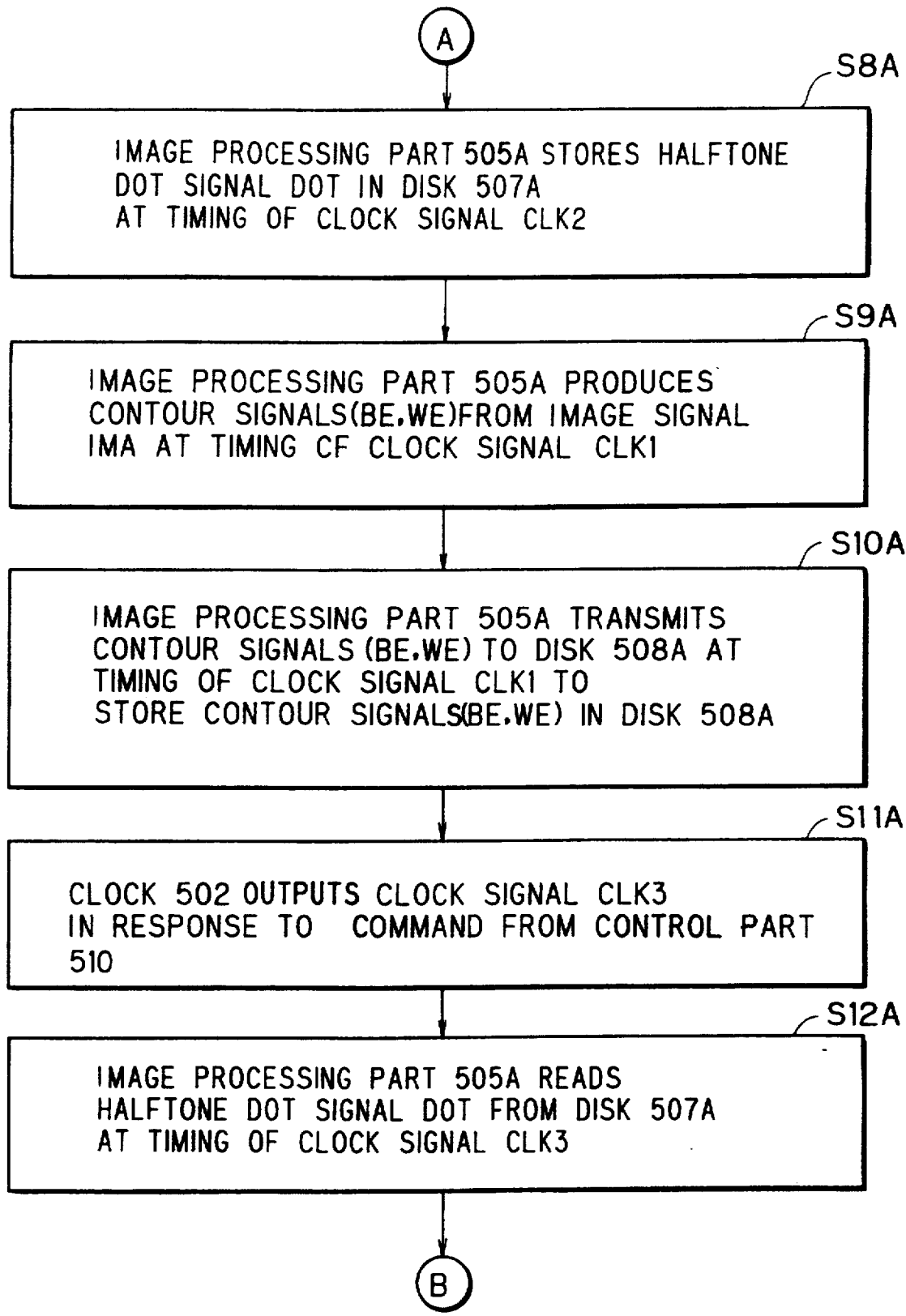
Figure 27:
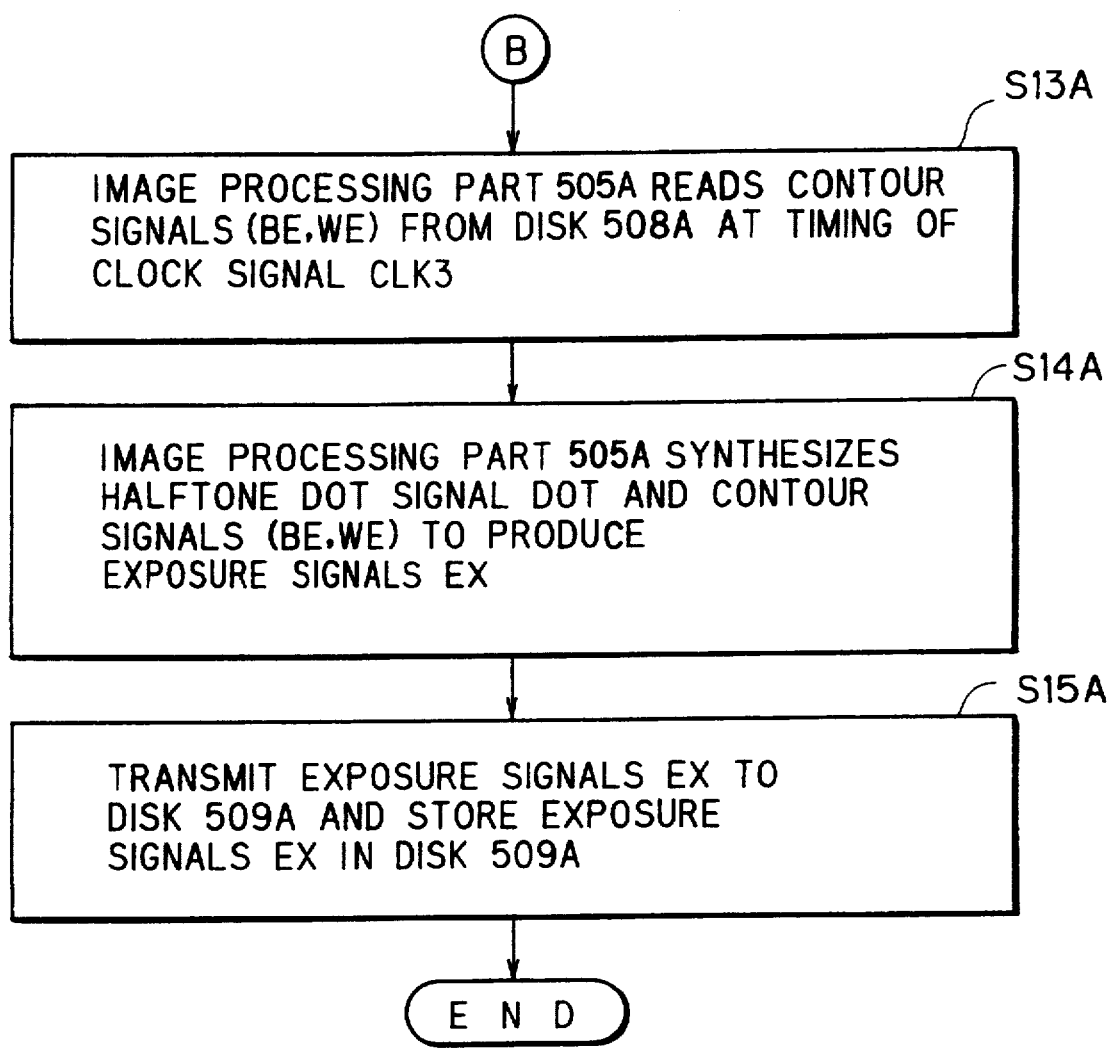

While the embodiment shown in FIG. 20 is adapted to directly implement the processing shown in FIG. 17 in a software manner, halftone dot signals and a contour signal may not be produced in response to the clock signals CLK3 and CLK4 respectively to be synthesized with each other but such halftone dot signals and contour signal may be produced from the image signals IMA respectively and stored to be thereafter synthesized with each other, as shown in FIG. 21 (see FIGS. 25 to 27).

Referring to FIG. 21, an image processing part 505A produces halftone dot signals DOT at the timing of a clock signal CLK2 and a contour signal (BE, WE) at the timing of a clock signal CLK1 from image signals IMA read from a disk 506 at the timing of the clock signal CLK1. The halftone dot signals DOT are stored in a disk 507A at the timing of the clock signal CLK2, while the contour signal (BE, WE) is stored in a disk 508A at the timing of the clock signal CLK1. Thereafter the image processing part 505 reads the halftone dot signals DOT and the contour signal (BE, WE) from the disks 507A and 508A respectively at the timing of a clock signal CLK3 generated from a clock 502 to synthesize the same with each other, thereby storing the as-obtained exposure signals EX in a disk 509A similarly to the above. In this case, the halftone dot signals DOT and the contour signal (BE, WE) can be easily synthesized in synchronization with no delay processing only by the clock signal CLK3.

While the invention has been shown and described in detail, the foregoing description is in all aspects illustrative and not restrictive. It is therefore understood that numerous modifications and variations can be devised without departing from the scope of the invention.

What is claimed is:

1. An image processing unit for converting an image signal into an exposure signal, comprising:
   (a) means for reading an image of an original to obtain an image signal;
   (b) means for producing a first clock signal having a relatively low frequency and a second clock signal having a relatively high frequency, said first and second clock signals being synchronized with each other;
   (c) means for producing an output start signal;
   (d) means for producing a halftone dot signal from said image signal in response to said first clock signal to output said halftone dot signal in response to said output start signal;
   (e-1) means for differentiating said image signal in response to said second clock signal to produce a contour signal indicative of an edge of said image;
   (e-2) means for starting an output of said contour signal in response to said output start signal; and
   (f) means for synthesizing said halftone dot signal and said contour signal to produce an exposure signal usable to selectively expose a photosensitive material.

2. An image processing unit for converting an image signal, comprising:
   (a) means for reading an image of an original to obtain an image signal
   (b) means for producing a first clock signal having a relatively low frequency and a second clock signal having a relatively high frequency, said first and second clock signals being synchronized with each other;
   (c) means for producing an output start signal;
   (d) means for producing a halftone dot signal from said image signal in response to said first clock signal to output said halftone dot signal in response to said output start signal;
   (e) means for producing a contour signal indicative of an edge of said image from said image signal in response to said second clock signal to output said contour signal in response to said output start signal;
   (f) means for synthesizing said halftone dot signal and said contour signal to produce an exposure signal usable to selectively expose a photosensitive material; wherein
   said means (e) includes
   (e-1) means for separating said image signal into a black edge signal and a white edge signal in response to said second clock signal,
   said black edge signal having a first polarity and being indicative of change from a low-density image region to a high-density image region in said image,
   said white edge signal having a second polarity reverse to said first polarity and being indicative of change from said high-density image region to said low-density image region; and
   (e-2) means for outputting said separated black and white edge signals as said contour signal in response to said output start signal.

3. The image processing unit of claim 2, further comprising:
   (g) means for producing a negative/positive signal indicating whether said photosensitive material has a positive sensitivity or a negative sensitivity to light,
   said means (f) being means for synthesizing said halftone dot signal and said contour signal in response to said negative/positive signal.

4. The image processing unit of claim 3, wherein said means (f) includes:
   (f-1) means for performing said synthesis, when said negative/positive signal indicates that said photosensitive material has said positive sensitivity,
   such that said exposure signal is given by said black edge signal when said black edge signal is not zero and said white edge signal is zero,
   such that said exposure signal set to a level that causes no exposure independently of said halftone dot signal where said black edge signal is zero and said white edge signal is not zero, and
   such that said exposure signal is given by said halftone dot signal when said black and white edge signals are both zero; and
   (f-2) means for performing said synthesis, when said negative/positive signal indicates that said photosensitive material has said negative sensitivity,
   such that said exposure signal is given by said white edge signal when said white edge signal is not zero and said black edge signal is zero,
   such that said exposure signal is set to said level that causes no exposure independently of said halftone dot signal when said white edge signal is zero and said black edge signal is not zero, and
   such that said exposure signal is given by said halftone dot signal when said black and white edge signals are both zero.

5. The image processing unit of claim 4, wherein said means (f-1) includes:
   (f-1-1) means for producing an AND signal providing the logical product of said halftone dot signal and an inverted white edge signal; and
   (f-1-2) means for producing an OR signal providing the logical sum of said AND signal and said black edge signal to output said OR signal as said exposure signal, and
   said means (f-2) includes:
   (f-2-1) means for producing an AND signal providing the logical product of said halftone dot signal and an inverted black edge signal; and (f-2-2) means for producing an OR signal providing the logical sum of said AND signal and said white edge signal to output said OR signal as said exposure signal.

6. The image processing unit of claim 3, wherein said means (d) includes
(d-1) means for inverting or non-inverting said image signal in response to said negative/positive signal prior to the production of said halftone dot signal.

7. The image processing unit of claim 6, wherein said means (c) includes:
(c-1) means for producing a first output start signal; and
(c-2) means for producing a second output start signal delayed for a predetermined time relative to said first output start signal, and
said means (d) includes:
(d-2) means for storing said image signal outputted from said means (d-1) in response to said first clock signal to output said stored image signal in response to said first output start signal; and
(d-3) means for comparing said image signal outputted from said means (d-2) with a previously inputted reference image signal to produce said halftone dot signal,
the time required for said comparison and production being equivalent to said predetermined time,
said means (e-2) being means for outputting said contour signal in response to said second output start signal.

8. The image processing unit of claim 7, wherein said means (e-2) includes:
(e-2-1) means for storing said black and white edge signals in response to said second clock signal; and
(e-2-2) means for outputting said stored black and white edge signals in response to said second output start signal.

9. The image processing unit of claim 8, wherein said means (b) includes:
(b-1) means for producing said second clock signal; and
(b-2) means for dividing said second clock signal as a function of a predetermined dividing ratio to produce said first clock signal.

10. The image processing unit of claim 9, wherein said means (b-1) includes:
(b-1-1) means for storing a magnification signal indicative of a recording magnification specified when said image signal is recorded on said photosensitive material as a function of said exposure signal; and
(b-1-2) means for producing said first clock signal as a function of said magnification signal to output said first clock signal.

11. The image processing unit of claim 10, further comprising
(h) means for producing a selection signal selecting a color separation from color separations of said image,
said means (d-2) including:
(d-2-1) means for storing image signals in response to said first clock signal; and
(d-2-2) means for reading one of said stored image signals which corresponds to said color separation selected by said selection signal to output said image signal in response to said first output start signal,
said means (e-2-2) being means for reading respective one of said stored black and white edge signals which corresponds to said color separation selected by said selection signal to output said read black and white edge signals in response to said second output start signal.

12. The image processing unit of claim 11, wherein said means (e-1) includes:
(e-1-1) means for separating said image signal into said black edge signal and said white edge signal in response to said second clock signal to obtain a separated black edge signal and a separated white edge signal, respectively; and
(e-1-2) means for expanding or compressing said separated black and white edge signals, respectively, to a level corresponding to said magnification signal in response to said second clock signal.

13. The image processing unit of claim 12, wherein said means (a) is means for reading said image of said original to generate an analog signal as said image signal, and
said means (e-1-1) includes:
(e-1-1-1) means for differentiating said image signal to produce a differential signal indicative of density change in said image;
(e-1-1-2) means for separating said black edge signal and said white edge signal from said differential signal; and
(e-1-1-3) means for digitizing said separated black and white edge signals in response to said second clock signal.

14. The image processing unit of claim 13, wherein said means (e-1-1-1) includes an impedance element, and
said means (e-1-1-2) includes a rectifying device.

15. The image processing unit of claim 12, wherein said means (a) is means for reading said image of said original to generate an analog signal as said image signal and for converting said analog signal into a digital image signal, and
said means (e-1-1) includes:
(e-1-1-1) means for differentiating said digital image signal in response to said second clock signal to produce a differential signal indicative of density change in said image; and
(e-1-1-2) means for separating said black edge signal and said white edge signal from said differential signal.

16. The image processing unit of claim 15, wherein said means (e-1-1-2) includes:
(e-1-1-2-1) means for comparing said differential signal with a previously provided first reference signal to output said black edge signal; and
(e-1-1-2-2) means for comparing said differential signal with a previously provided second reference signal to output said white edge signal.

17. The image processing unit of claim 16, wherein said first reference signal has a negative polarity, and said second reference signal has a positive polarity.

18. The image processing unit of claim 17, wherein said differential signal is produced by the operation processing expressed as:

$$E_{xy} = 8D_{xy} - (D_{x-1\,y-1} + D_{x-1\,y} + D_{x-1\,y+1} + D_{x\,y-1} + D_{x\,y+1} + D_{x+1\,y-1} + D_{x+1\,y} + D_{x+1\,y+1})$$

where $D_{xy}$ is said image signal corresponding to position coordinates (x,y) defined on said original, and $E_{xy}$ is said differential signal of said image signal.

19. An image processing unit for converting an image signal into an exposure signal, comprising:
   (a) means for storing an image signal indicative of an image of an original;
   (b) means for producing a first clock signal having a relatively high frequency and a second clock signal having a relatively low frequency, said first and second clock signals being synchronized with each other;
   (c) means for producing a third clock signal;
   (d) means for reading said image signal from said means (a) in response to said first clock signal;
   (e) means for producing a halftone dot signal from said image signal in response to said second clock signal to store said halftone dot signal in response to said second clock signal;
   (f-1) means for differentiating said image signal in response to said first clock signal to produce a contour signal indicative of an edge of said image;
   (f-2) means for storing said contour signal in response to said first clock signal;
   (g) means for reading said halftone dot signal and said contour signal from said means (e) and (f-2), respectively, in response to said third clock signal to synthesize said halftone dot signal and said contour signal; and
   (h) means for storing said synthesized signal as an exposure signal usable to selectively expose a photosensitive material.

20. An image processing unit for converting an image signal into an exposure signal, comprising:
   (a) means for storing an image signal indicative of an image of an original;
   (b) means for producing a first clock signal having a relatively high frequency and a second clock signal having a relatively low frequency, said first and second clock signals being synchronized with each other;
   (c) means for producing a third clock signal;
   (d) means for producing a fourth clock signal delayed for a predetermined time relative to said third clock signal;
   (e) means for compressing said image signal read in response to said first clock signal to generate a compressed image signal and to store said compressed image signal in response to said second clock signal;
   (f) means for reading said compressed image signal in response to said third clock signal to compare said image signal with a previously provided reference image signal to produce a halftone dot signal;
   (g) means for differentiating said read image signal in response to said first clock signal to generate a differential signal and to store said differential signal in response to said first clock signal;
   (h) means for reading said differential signal in response to said fourth clock signal to produce a contour signal indicative of an edge of said image from said differential signal and to synthesize said contour signal and said halftone dot signal in response to said fourth clock signal to obtain a synthetic signal; and
   (i) means for storing said synthetic signal as said exposure signal.

21. An image processing method for converting an image signal into an exposure signal, comprising the steps of:
   (a) reading an image of an original to generate an image signal;
   (b) producing a first clock signal having a relatively low frequency and a second clock signal having a relatively high frequency, said first and second clock signals being synchronized with each other;
   (c) producing an output start signal;
   (d) producing a halftone dot signal from said image signal in response to said first clock signal to output said halftone dot signal in response to said output start signal;
   (e-1) differentiating said image signal in response to said second clock signal to produce a contour signal indicative of an edge of said image;
   (e-2) starting an output of said contour signal in response to said output start signal; and
   (f) synthesizing said halftone dot signal and said contour signal to produce an exposure signal usable to selectively expose a photosensitive material.

22. An image processing method for converting an image signal into an exposure signal, comprising the steps of:
   (a) reading an image of an original to generate an image signal;
   (b) producing a first clock signal having a relatively low frequency and a second clock signal having a relatively high frequency, said first and second clock signals being synchronized with each other;
   (c) producing an output start signal
   (d) producing a halftone dot signal from said image signal in response to said first clock signal to output said halftone dot signal in response to said output start signal;
   (e) producing a contour signal indicative of an edge of said image from said image signal in response to said second clock signal to output said contour signal in response to said output start signal;
   (f) synthesizing said halftone dot signal and said contour signal to produce an exposure signal usable to selectively expose a photosensitive material; wherein
   said step (e) includes the steps of:
      (e-1) separating said image signal into a black edge signal and a white edge signal in response to said second clock signal,
      said black edge signal having a first polarity and being indicative of change from a low-density image region to a high-density image region in said image,
      said white edge signal having a second polarity reverse to said first polarity and being indicative of change from said high-density image region to said low-density image region; and
      (e-2) outputting said separated black and white edge signals as said contour signal in response to said output start signal.

23. The image processing method of claim 22, wherein
   said step (c) includes the steps of:
      (c-1) producing said output start signal; and
      (c-2) producing a negative/positive signal indicating whether a photosensitive material to be exposed as a function of said exposure signal has a positive sensitivity or a negative sensitivity to light, and said step (f) is the step of synthesizing said halftone dot signal and said contour signal in response to said negative/positive signal.

24. The image processing method of claim 23, wherein
said step (f) includes the steps of:
(f-1) detecting whether said negative/positive signal indicates said positive sensitivity or said negative sensitivity;
(f-2) performing said synthesis, when it is detected that said negative/positive signal indicates said positive sensitivity in said step (f-1),
such that said exposure signal is given by said black edge signal when said black edge signal is not zero and said white edge signal is zero,
such that said exposure signal is set to a level that causes no exposure independently of said halftone dot signal when said black edge signal is zero and said white edge signal is not zero, and
such that said exposure signal is given by said halftone dot signal when said black and white edge signals are both zero; and
(f-3) performing said synthesis, when it is detected that said negative/positive signal indicates said negative sensitivity in said step (f-1),
such that said exposure signal is given by said white edge signal when said white edge signal is not zero and said black edge signal is zero,
such that said exposure signal is set to said level that causes no exposure independently of said halftone dot signal when said white edge signal is zero and said black edge signal is not zero, and
such that said exposure signal is given by said halftone dot signal when said black and white edge signals are both zero.

25. The image processing method of claim 24, wherein
said step (f-2) includes the steps of:
(f-2-1) producing an AND signal providing the logical product of said halftone dot signal and an inverted white edge signal; and
(f-2-2) producing an OR signal providing the logical sum of said AND signal and said black edge signal to output said OR signal as said exposure signal, and
said step (f-3) includes the steps of:
(f-3-1) producing an AND signal providing the logical product of said halftone dot signal and an inverted black edge signal; and
(f-3-2) producing an OR signal providing the logical sum of said AND signal and said white edge signal to output said OR signal as said exposure signal.

26. The image processing method of claim 23, wherein
said step (d) includes the step of
(d-1) inverting or non-inverting said image signal in response to said negative/positive signal prior to the production of said halftone dot signal.

27. The image processing method of claim 26, wherein
said step (c-1) includes the steps of:
(c-1-1) producing a first output start signal; and
(c-1-2) producing a second output start signal delayed for a predetermined time relative to said first output start signal, and
said step (d) includes the steps of:

(d-2) storing said image signal outputted in said step (d-1) in response to said first clock signal to output said stored image signal in response to said first output start signal; and
(d-3) comparing said image signal outputted in said step (d-2) with a previously inputted reference image signal to produce said halftone dot signal, the time required for said comparison and production being equivalent to said predetermined time,
said step (e-2) being the step of outputting said contour signal in response to said second output start signal.

28. The image processing method of claim 27, wherein
said step (e-2) includes the steps of:
(e-2-1) storing said black and white edge signals in response to said second clock signal; and
(e-2-2) outputting said stored black and white edge signals in response to said second output start signal.

29. The image processing method of claim 28, wherein
said step (b) includes the steps of:
(b-1) producing said first clock signal; and
(b-2) dividing said first clock signal as a function of a predetermined dividing ratio to produce said second clock signal.

30. The image processing method of claim 29, wherein
said step (b-1) includes the steps of:
(b-1-1) storing a magnification signal,
said magnification signal providing a recording magnification specified when said image signal is recorded on a predetermined photosensitive material as a function of said exposure signal; and
(b-1-2) producing said first clock signal as a function of said magnification signal to output said first clock signal.

31. The image processing method of claim 30, wherein
said step (c) further includes the step of:
(c-3) producing a selection signal selecting a color separation from color separations of said image, and
said step (d-2) includes the steps of:
(d-2-1) storing image signals in response to said first clock signal; and
(d-2-2) reading one of said stored image signals which corresponds to said color separation selected by said selection signal to output said read image signal in response to said first output start signal,
said step (e-2-2) being the step of reading respective one of said stored black and white edge signals which corresponds to said color separation selected by said selection signal to output said read black and white edge signals in response to said second output start signal.

32. The image processing method of claim 31, wherein
said step (e-1) includes the steps of:
(e-1-2) separating said image signal into said black edge signal and said white edge signal in response to said second clock signal; and
(e-1-2) expanding or compressing said separated black and white edge signals, respectively, to a level corresponding to said magnification signal in response to said second clock signal.

33. The image processing method of claim 32, wherein
   said step (a) is the step of reading said image of said original to generate an analog signal as said image signal, and
   said step (e-1-1) includes the steps of:
   (e-1-1-1) differentiating said image signal to produce a differential signal indicative of density change in said image;
   (e-1-1-2) separating said black edge signal and said white edge signal from said differential signal to obtain separated black and white edge signals; and
   (e-1-1-3) digitizing said separated black and white edge signals in response to said second clock signal.

34. The image processing method of claim 32, wherein
   said step (a) is the step of reading said image signal of said original to generate an analog signal as said image signal and converting said analog signal into a digital image signal, and
   said step (e-1-1) includes the steps of:
   (e-1-1-1) differentiating said digital image signal in response to said second clock signal to produce a differential signal indicative of density change in said image; and
   (e-1-1-2) separating said black edge signal and said white edge signal from said differential signal.

35. The image processing method of claim 34, wherein
   said step (e-1-1-2) includes the steps of:
   (e-1-1-2-1) comparing said differential signal with a previously provided first reference signal to output said black edge signal; and
   (e-1-1-2-2) comparing said differential signal with a previously provided second reference signal to output said white edge signal.

* * * * *